(12) United States Patent
Itako

(10) Patent No.: US 8,908,404 B2
(45) Date of Patent: Dec. 9, 2014

(54) SOLAR POWER GENERATION SYSTEM, CONTROL DEVICE USED FOR SOLAR POWER GENERATION SYSTEM, AND CONTROL METHOD AND PROGRAM FOR SAME

(75) Inventor: Kazutaka Itako, Tokyo (JP)

(73) Assignee: School Judicial Person Ikutokugakuen, Kanagawa (JP)

( * ) Notice: Subject to any disclaimer, the term of this patent is extended or adjusted under 35 U.S.C. 154(b) by 103 days.

(21) Appl. No.: 13/819,613

(22) PCT Filed: Aug. 26, 2011

(86) PCT No.: PCT/JP2011/069327
§ 371 (c)(1),
(2), (4) Date: Feb. 27, 2013

(87) PCT Pub. No.: WO2012/026593
PCT Pub. Date: Mar. 1, 2012

(65) Prior Publication Data
US 2013/0155739 A1    Jun. 20, 2013

(30) Foreign Application Priority Data

Aug. 27, 2010    (JP) ................................ 2010-191357

(51) Int. Cl.
| | |
|---|---|
| H02M 3/24 | (2006.01) |
| H02M 7/537 | (2006.01) |
| G05F 1/00 | (2006.01) |
| G05F 3/08 | (2006.01) |
| H02M 7/44 | (2006.01) |
| G05F 1/67 | (2006.01) |

(52) U.S. Cl.
CPC . G05F 3/08 (2013.01); H02M 7/44 (2013.01); G05F 1/67 (2013.01); Y10S 323/906 (2013.01)
USPC .............. 363/95; 363/131; 323/285; 323/906

(58) Field of Classification Search
CPC .............. G05F 3/08; G05F 1/67; H02M 7/44; H02M 3/157; H02M 2001/007
USPC ............ 363/37–41, 79–81, 95–98, 131–132; 323/222–225, 271–275, 282–285, 323/299–300, 906
See application file for complete search history.

(56) References Cited

U.S. PATENT DOCUMENTS 5,654,883 A * 8/1997 Takehara et al. ................. 363/79
5,869,956 A * 2/1999 Nagao et al. .................... 323/299
(Continued)

FOREIGN PATENT DOCUMENTS

| JP | 07-234733 A | 9/1995 |
| JP | 2007-133765 A | 5/2007 |

(Continued)

OTHER PUBLICATIONS

International Search Report of PCT/JP2011/069327, mailing date of Nov. 29, 2011.

*Primary Examiner* — Timothy J Dole
*Assistant Examiner* — Yusef Ahmed
(74) *Attorney, Agent, or Firm* — Westerman, Hattori, Daniels & Adrian, LLP

(57) ABSTRACT

In a light power generation system, a control device, a control method, and a program, efficient power can be supplied. The maximum power detection unit operates a MOSFET in a power converter circuit and open-circuits both ends of a solar cell panel in the maximum power detection mode. After that, the maximum power detection unit short-circuits both ends of the solar cell panel, detects a maximum power by monitoring the output power of the solar cell panel during a period from the open state to the short-circuited state, and defines the voltage of the solar cell panel as an optimal voltage when detecting the maximum power. In a tracking operation mode, the control unit performs PWM control with respect to the MOSFET by defining the optimal voltage to be a reference signal. Operations are repeated between the maximum power detection mode and the tracking operation mode.

19 Claims, 21 Drawing Sheets

(56) References Cited

U.S. PATENT DOCUMENTS

| | | | |
|---|---|---|---|
| 7,579,716 B2* | 8/2009 | Sato et al. | 307/80 |
| 8,013,583 B2* | 9/2011 | Matan | 323/282 |
| 8,018,748 B2* | 9/2011 | Leonard | 363/95 |
| 2002/0041505 A1* | 4/2002 | Suzui et al. | 363/95 |
| 2003/0066555 A1* | 4/2003 | Hui et al. | 136/246 |
| 2004/0207366 A1* | 10/2004 | Sung | 320/140 |
| 2006/0022648 A1* | 2/2006 | Ben-Yaakov et al. | 323/222 |
| 2006/0171182 A1* | 8/2006 | Siri et al. | 363/131 |
| 2007/0133241 A1* | 6/2007 | Mumtaz et al. | 363/131 |
| 2007/0159866 A1* | 7/2007 | Siri | 363/95 |
| 2008/0130336 A1* | 6/2008 | Taguchi | 363/125 |
| 2008/0141998 A1* | 6/2008 | Sun | 126/601 |
| 2008/0143188 A1* | 6/2008 | Adest et al. | 307/82 |
| 2008/0203994 A1* | 8/2008 | Park | 323/318 |
| 2009/0115393 A1* | 5/2009 | Yoshida et al. | 323/300 |
| 2009/0316447 A1* | 12/2009 | Kim et al. | 363/37 |
| 2009/0316452 A1* | 12/2009 | Kim et al. | 363/60 |
| 2010/0133911 A1* | 6/2010 | Williams et al. | 307/82 |
| 2010/0156185 A1* | 6/2010 | Kim et al. | 307/72 |
| 2010/0225170 A1* | 9/2010 | Hjort et al. | 307/65 |
| 2010/0264736 A1* | 10/2010 | Mumtaz et al. | 307/48 |
| 2011/0175565 A1* | 7/2011 | Lee | 320/101 |
| 2012/0047386 A1* | 2/2012 | Matsui | 713/340 |
| 2012/0049635 A1* | 3/2012 | Schelenz et al. | 307/82 |

FOREIGN PATENT DOCUMENTS

| | | |
|---|---|---|
| JP | 4294346 B2 | 7/2009 |
| JP | 2010-061263 A | 3/2010 |

* cited by examiner

FIG. 3

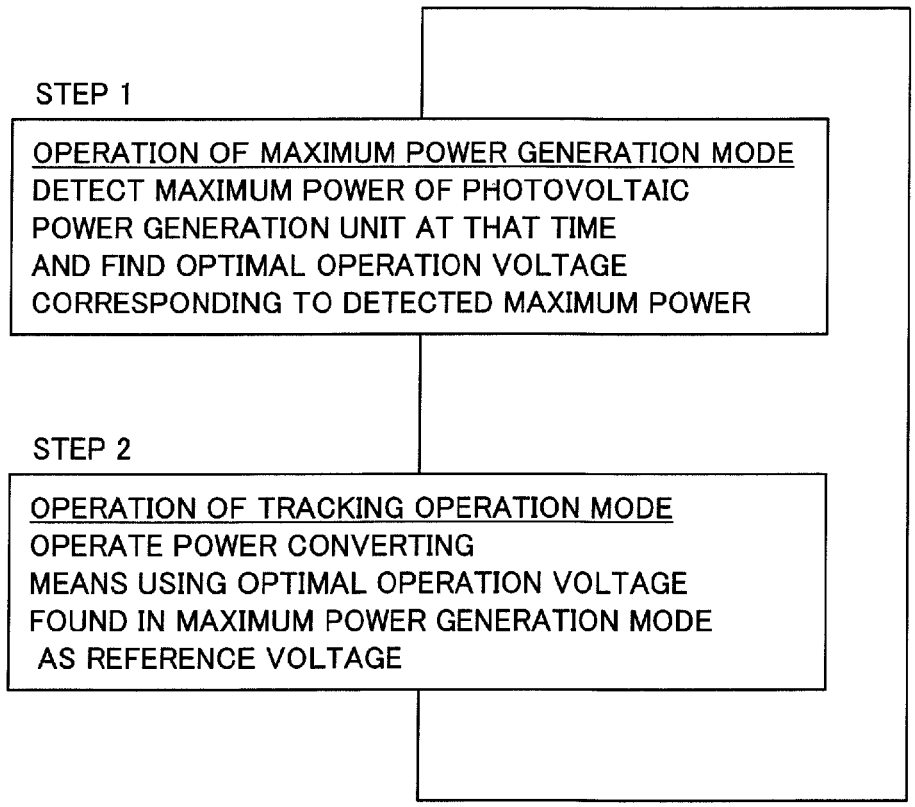

BASIC OPERATION OF CONTROLLING LIGHT POWER GENERATION UNIT OF PRESENT INVENTION

OPERATION IN MAXIMUM POWER GENERATION MODE OF STEP 1 AND OPERATION IN TRACKING OPERATION MODE OF STEP 2 ARE ALTERNATELY AND CONTINUOUSLY REPEATED BY PREDETERMINED PERIOD

STEP 1

OPERATION OF MAXIMUM POWER GENERATION MODE
DETECT MAXIMUM POWER OF PHOTOVOLTAIC POWER GENERATION UNIT AT THAT TIME
AND FIND OPTIMAL OPERATION VOLTAGE CORRESPONDING TO DETECTED MAXIMUM POWER

STEP 2

OPERATION OF TRACKING OPERATION MODE
OPERATE POWER CONVERTING
MEANS USING OPTIMAL OPERATION VOLTAGE
FOUND IN MAXIMUM POWER GENERATION MODE
AS REFERENCE VOLTAGE

PANEL TEMPERATURE 33[°C], IRRADIANCE 853[W/m²]

HILL-CLIMBING METHOD

EXAMPLE OF UNSTABLE TRACKING OPERATION NEAR OPERATION POINT B

INSTANTANEOUS SCANNING METHOD

EXAMPLE OF STABLE TRACKING OPERATION AT OPERATION POINT A

NO SHADOW

SHADOW

NO SHADOW

SHADOW

EXAMPLE OF OPERATION WAVEFORM

SOLAR POWER GENERATION SYSTEM, CONTROL DEVICE USED FOR SOLAR POWER GENERATION SYSTEM, AND CONTROL METHOD AND PROGRAM FOR SAME

TECHNICAL FIELD

The present invention relates to the art of converting the power generated by a light power generation unit, for example, a solar unit, which generates power in accordance with the incident light.

Specifically, the present invention relates to an invention of applying a maximum power point tracking (MPPT) control method to efficiently convert an output power of a solar cell panel or other light power generation panel to electric power.

BACKGROUND ART

There is known a solar power generation system which assembles a plurality of solar cells to configure a solar cell panel and supplies the electric power generated by that solar cell panel to a load.

A solar cell fluctuates in output power according to the irradiance of the incident sunlight or the ambient temperature. The maximum power operation point also greatly fluctuates. For this reason, a maximum power point tracking (hereinafter abbreviated as MPPT) control method of detecting the maximum output power of a solar cell panel, which fluctuates according to the irradiance or other conditions, has been proposed.

Further, in a grid interconnection type solar power generation system in which a solar cell panel is connected to a load, there is proposed MPPT control using the so-called "hill-climbing method" of searching for the maximum output power of the solar cell panel (for example, PLT 1, Japanese Patent Publication No. 7-234733 A1).

In the above MPPT control, in order to search for the maximum power point of the solar cell panel with a high precision, it is sufficient that the control processing system reduce the amount of change of the width of the pulse which is applied to a gate of a switching element in a DC-DC converter used as the power converting means. However, in order to reduce the amount of change of the pulse width, it becomes necessary to raise the switching frequency of the DC-DC converter or suitably improve the processing capability of the control processing system. For realization of that, there are restrictions in practical use in terms of technology, price, etc.

For example, if reducing the amount of change of the pulse width, a longer time is taken for finding the maximum power point in response to a change of the irradiance of the light irradiated to the solar cell panel and therefore the response becomes a problem. There was therefore a limit to raising the efficiency of power conversion.

On the other hand, if increasing the amount of change of the width of the pulse which is applied to the gate of the switching element in order to improve the response, the power greatly fluctuates in the steady state, therefore the efficiency of power acquisition falls.

The inventors of the present application came up with an invention which improves the control method already in practical use in grid interconnection (for example PLT 2, Japanese Patent No. 4294346).

Below, the invention disclosed in PLT 2 will be summarized.

In the maximum power detection mode, the system controls the switching element configuring the DC-DC converter to change the output current of the solar cell panel which flows to an inductor configuring the DC-DC converter from zero to a short-circuiting current and thereby instantaneously scan a current-voltage (I-V) characteristic of the solar cell panel.

Then, in the tracking operation mode, the system controls the switching element in the DC-DC converter using the detected output current of the solar cell panel as the optimal solar cell current so as to track the output current of the solar cell panel using this optimal solar cell current as the reference signal and operates the panel at the obtained maximum power operation point.

By alternately performing the operation in the maximum power detection mode of detecting the maximum power and the operation in the tracking operation mode of performing an operation for tracking the optimal solar cell current detected in this way and by repeatedly operating in cycles of the maximum power detection mode and tracking operation mode, the maximum power point is reliably and strictly found, and power output control can be performed which tracks the optimal solar cell current in accordance with the maximum power point found.

CITATIONS LIST

Patent Literature

PLT 1: Japanese Patent Publication No. 7-234733 A1
PLT 2: Japanese Patent No. 4294346

SUMMARY OF INVENTION

Technical Problem

In the invention disclosed in PLT 2, the switching element built-in the DC-DC converter is turned on/off to change the output current of the solar cell panel flowing in the inductor built-in the DC-DC converter from zero to a short-circuited current, therefore it becomes indispensable to use an inductor for the DC-DC converter.

In this regard, when an efficient photovoltaic power generation system is configured by applying the MPPT control method, it has been desired to make use of the various types of power converting means where use of an inductor in the power converting means is not indispensable.

In addition, it has been desired to find out a control technique and a control device to which such various types of power converting means can be applied.

Further, the present inventors discovered there is a case where there are a plurality of peaks in the output power of the solar cell panel when the solar cell panel is partially shaded or when the solar cell panel is used in a mixed state and the operation follows the lower peak. Accordingly, it has been desired to find out a control technique and control device in which various types of power converting means can be applied and which enable effective control even in such a state.

Note that, it has been desired to find out a control technique and control device in which various types of power converting means can be applied with a high efficiency not only for the grid interconnection type photovoltaic power generation system tracking fluctuation of the load in operation as exemplified in PLT2, but also for an independent type photovoltaic power generation system.

Above, the issues and the desires with respect to the same were explained with reference to a solar cell panel as an example of the light power generation unit. However, the same is true also for a light power generation control system using another light power generation unit for generating power in accordance with incident light.

The present invention provides a light power generation system for realizing the above exemplified desires or dealing with the issues.

Further, the present invention provides a power conversion apparatus which can be suitably applied to that light power generation control system.

Further, the present invention provides a control device which can be applied to a solar power generation system using the power conversion apparatus.

Further, the present invention provides a control method of the same and a program for the same.

Solution to Problem

The present invention is, as illustrated in FIG. 3, based on the following technical concepts.
(1) Operation mode as a whole
Operation in a maximum power detection mode (FIG. 3, step 1) and operation in a tracking operation mode (step 2 in FIG. 3) are continuously or periodically alternately repeated in line with the output power of the light power generation unit, for example, solar cell panel, which fluctuates according to the surroundings.
(2) In the maximum power detection mode (step 1), the optimal power of the solar power generation unit at that time is detected, and the optimal operation voltage corresponding to that optimal power is found.
(3) In the tracking operation mode (step 2), the found optimal operation voltage is used as a reference voltage to operate the power converting means.

A light power generation system of the present invention has a light power generation unit for generating power in response to incident light; a voltage detecting means for detecting an output voltage of the light power generation unit; a current detecting means for detecting an output current of the light power generation unit or a power detecting means for detecting an output power of the light power generation unit; a power converting means which includes a switching element, converts the output voltage of the light power generation unit in response to an on/off operation of the switching element, and outputs power of that voltage; and a controlling means.

The controlling means alternately performs a control operation of the maximum power detection mode and a control operation of a tracking operation mode and controls the switching element in the two modes to control the conversion operation of the power converting means.

The controlling means, in the maximum power detection mode,
(a) makes the switching element in the power converting means operate to a first logic state to open the circuit between the output terminals of the light power generation unit and
(b) makes the switching element operate to a second logic state from the open-circuit state to short-circuit the output terminals of the light power generation unit,
in the process of which it detects the point at which the power of the product of the voltage which was detected by the voltage detecting means and the current which was detected by the current detecting means or the power which was detected by the power detecting means becomes the maximum and
detects the voltage which was detected by the voltage detecting means at the time when detecting the maximum power as the optimal output voltage.

The controlling means, in the tracking operation mode, makes the switching element operate so that a difference between the reference voltage and the voltage detected by the voltage detecting means becomes "0" or almost "0" using the optimal output voltage as a reference voltage.

Further, according to the present invention, there is provided a control device performing the above control processing.

Further, according to the present invention, there is provided a control method for operation in the control device and a program for the same.

Advantageous Effects of Invention

According to the present invention, it becomes possible to utilize various types of power converting means where use of inductors in the power converting means is not an essential requirement.

Further, according to the present invention, a control technique and control device in which various types of power converting means can be applied were obtained.

Further, according to the present invention, it was possible to find a control technique and control device in which various types of power converting means can be applied and which enable effective control even in a case where the light power generation unit is partially shaded or a case where a plurality of peaks are formed in the output power of the light power generation unit when using a mixed configuration of light power generation unit.

According to the present invention, it was possible to find a control technique and control device in which various types of power converting means can be applied with a high efficiency for a grid interconnection type light power generation system which tracks fluctuation of the load in operation or an independent type light power generation system.

The present invention is not limited to a solar cell panel as the light power generation unit and can be applied to a light power generation control system using another light power generation unit which generates power in accordance with the incident light as well.

BRIEF DESCRIPTION OF DRAWINGS

FIG. 3 A view which illustrates a control operation mode which is illustrated in FIG. 1.

DESCRIPTION OF EMBODIMENTS

Embodiments of the present invention will be explained with reference to the attached drawings.

First Embodiment

Referring to FIG. 1 to FIG. 4, a first embodiment of a light power generation control system of the present invention will be explained.

Figure 1:
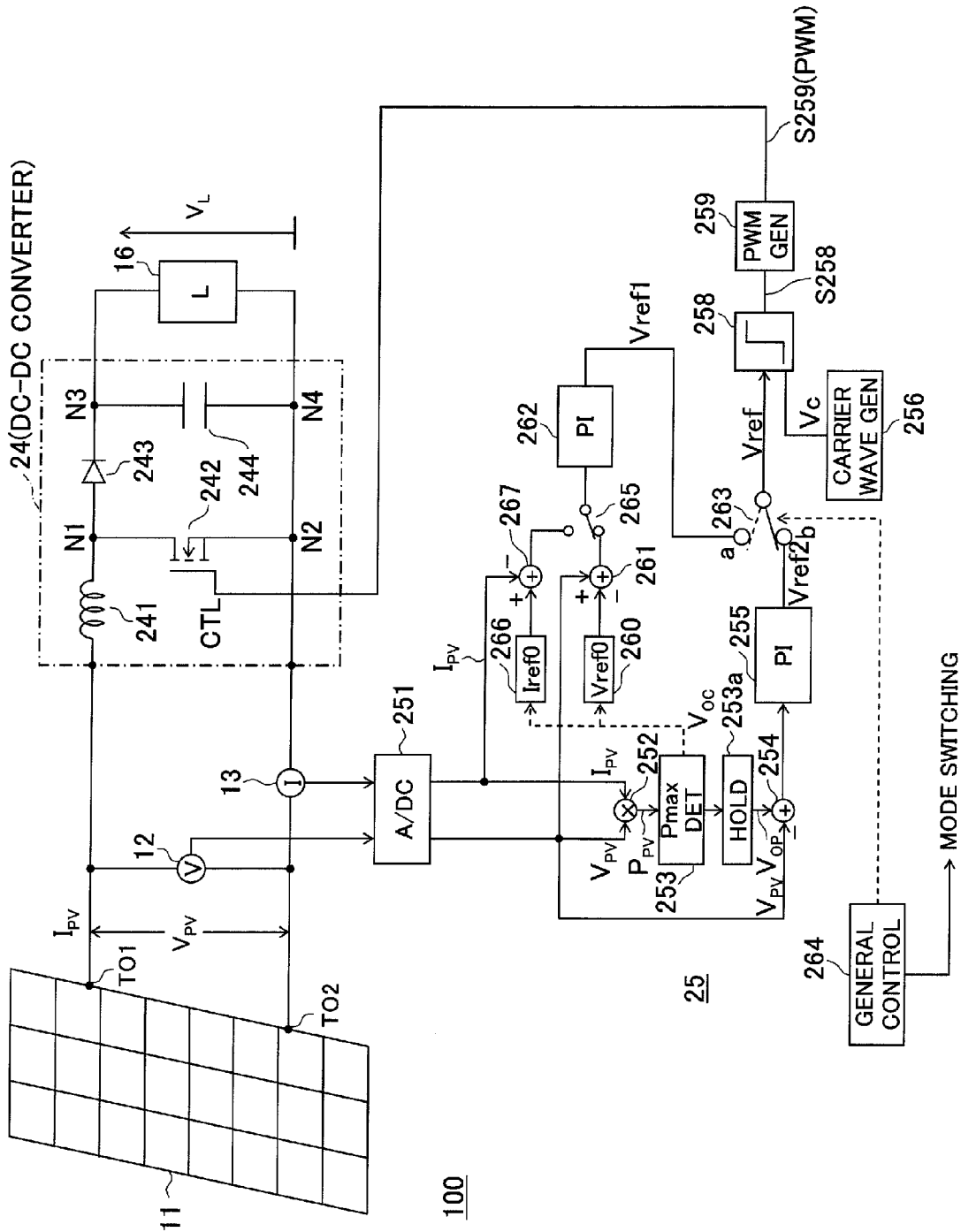
FIG. 1 A view of the configuration of a solar power generation system of a first embodiment of the present invention.
Figure 2:
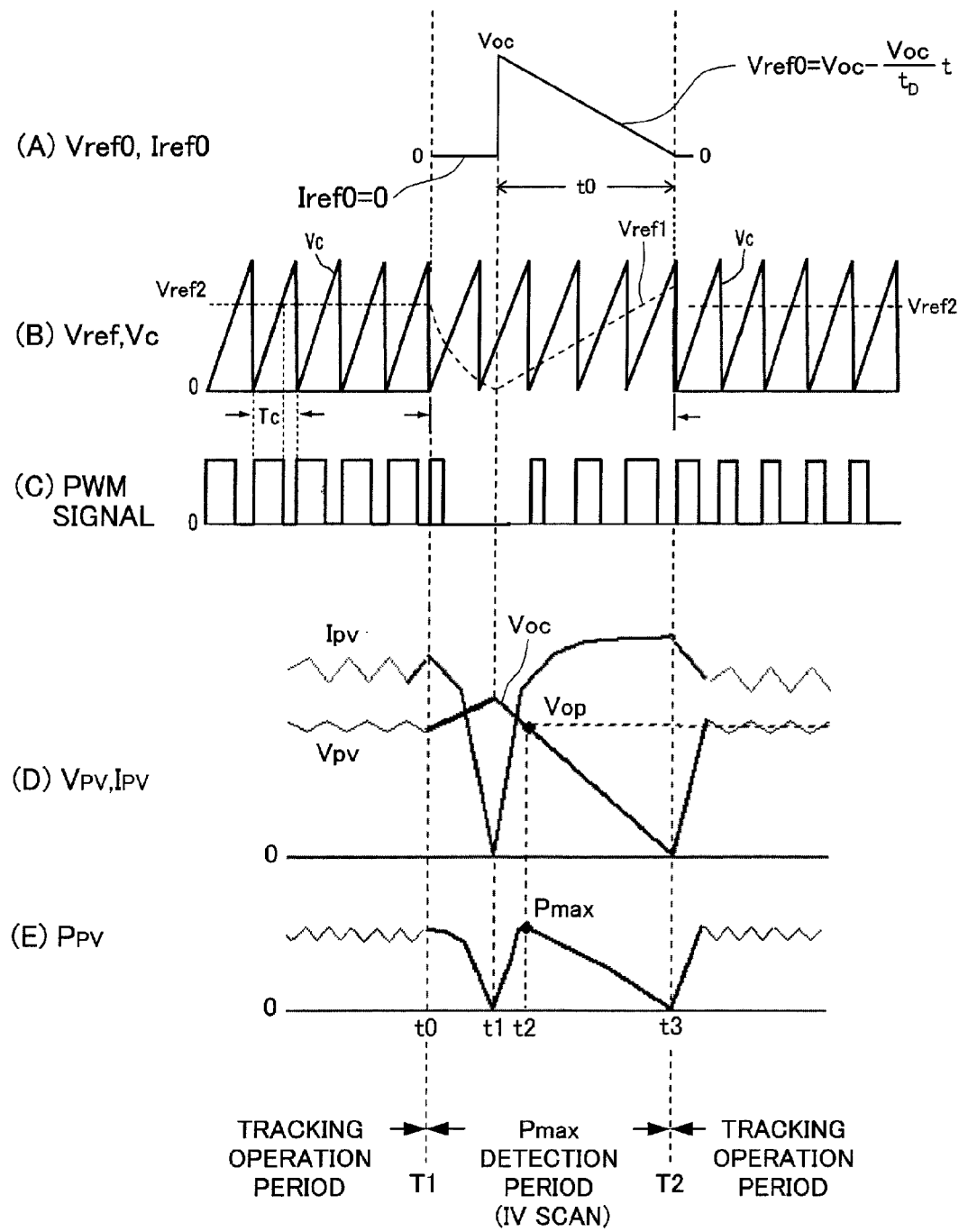
FIG. 2 A waveform diagram in a circuit which is illustrated in FIG. 1.
Figure 4:
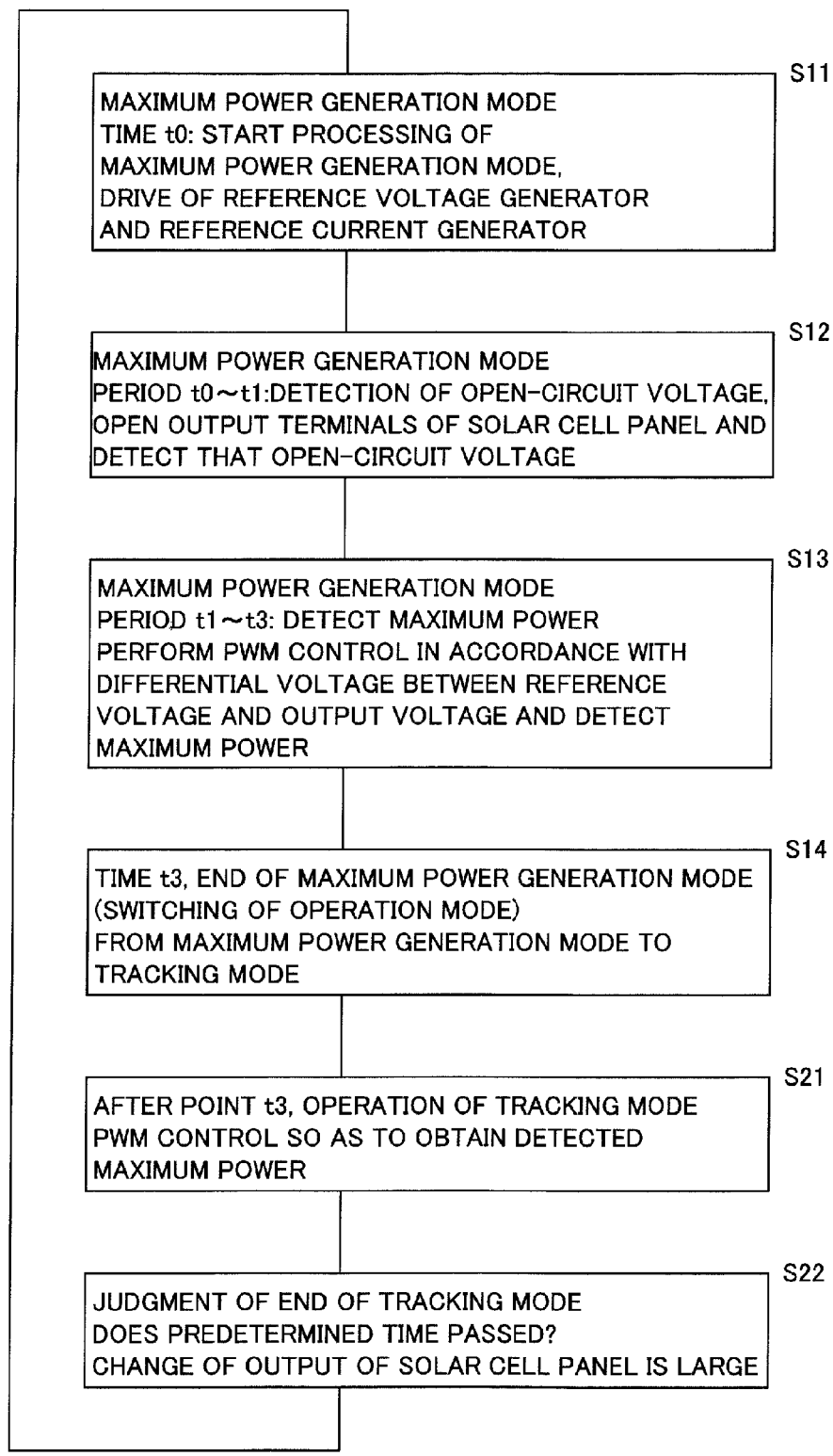
FIG. 4 A flow chart which shows the control operation illustrated in FIG. 1.

FIG. 1 is a view of the configuration showing an embodiment of an "independent type" solar power generation system. FIG. 2 to FIG. 4 are diagrams showing the operation of the photovoltaic power generation system illustrated in FIG. 1.

In the first embodiment, as an example of the light power generation unit of the present invention, a solar cell panel (PV) will be exemplified.

System Configuration

A solar power generation system 100 has a PV (PV) 11, a voltmeter 12 for detecting (measuring) an output voltage $V_{PV}$ between output terminals (TO1, TO2) of the PV 11, an ammeter 13 for detecting (measuring) an output current $I_{PV}$ of the PV 11, a power converter circuit 24 which has a DC-DC converter, and a control device 25 for controlling the power converter circuit 24.

The solar power generation system 100 supplies the power which was generated by the PV 11 in accordance with the incident light by the voltage $V_L$ which the load 16 side desires.

Here, the load 16 envisions a load which is independent from the commercial power supply, including a battery, or a load which is connected to a commercial power supply such as a grid interconnection inverter which has a function of keeping the voltage $V_L$ constant.

PV (PV)

The PV 11 is configured by a plurality of solar cells (hereinafter abbreviated as "cells"), each having a predetermined electromotive force, which are connected together. As the method of connection of the plurality of cells configuring the PV 11, various ones can be employed. For example, the plurality of cells may be connected in parallel or units to which a predetermined number of cells are connected in series may be connected in parallel. The number of cells used is selected in accordance with the desired power.

The PV 11 generates power in accordance with the irradiated light amount, temperature, and so on and outputs the same from the output terminals TO1 and TO2 to the power converter circuit 24.

Power Converting Means

The power converter circuit 24 of one embodiment of the power converting means of the present invention is a boost-type DC-DC converter which is comprised of an inductor 241, MOSFET 242, diode 243, and capacitor 244 which are connected as shown in the figure.

The power converter circuit 24 has a power conversion function of converting a DC power $P_{PV}$ (or DC voltage $V_{PV}$) which is generated at the PV 11 according to the control of the control device 25 which controls the MOSFET 242 by for example a PWM (pulse width modulation) method and supplying the result to the load 16 side.

The diode 243 is for backflow prevention.

The MOSFET 242 is connected between the output terminals TO1 and TO2 so as to open the circuit between or short-circuit the output terminals TO1 and TO2 (or nodes N1 and N2) in state in addition to execution of the power conversion function. The MOSFET 242 is one type of switching (SW) element of the present invention. Use can be made of another SW element such as a power transistor.

When, at a point of time t0 illustrated in FIG. 2, the MOSFET 242 becomes a first logic state, for example, the "open" state, and opens the circuit between the nodes N1 and N2, the output voltage $V_{PV}$ of the PV 11 is stored in the capacitor 244 with the characteristic which is defined by the time constant of the LC circuit of the inductor 241 and the capacitor 244. As a result, the voltage $V_{PV}$ between nodes N3 and N4 at the two ends of the capacitor 244 rises. On the other hand, the output current $I_{PV}$ and output power $P_{PV}$ of the PV 11 falls to "0" or almost "0".

When, at a point of time t1 illustrated in FIG. 2, the MOSFET 242 becomes a second logic state, for example, the "closed" state, and short-circuits the nodes N1 and N2, the voltage $V_{PV}$ between the nodes N3 and N4 at the two ends of the capacitor 244 falls. On the other hand, the output current $I_{PV}$ and output power $P_{PV}$ of the PV 11 increase from "0" or almost "0".

The invention disclosed in PLT 2 considers the operation of the inductor and turns the MOSFET on and off in an operation mode for detecting the maximum power Pmax for the MPPT control (the optimal power detection mode or I-V scan mode) so as to monitor the change of the current flowing in the inductor (transient characteristic).

In the power converter circuit 24, the inductor 241 operates only for the power conversion function and is not indispensable for monitoring the transient characteristic for the MPPT control. In this way, the power converting means applied to the present invention is not limited to a DC-DC converter as the circuit using the inductor 241 which is exemplified in FIG. 1. Details thereof will be explained later.

Note that, in the first embodiment, a power converter circuit 24 which uses a DC-DC converter using the inductor 241 which is illustrated in FIG. 1 will be explained.

Control Device

The control device 25 has an A/D converter (ADC) 521, multiplier 252, maximum power detector 253, holding circuit 253a, first adder 254, first control processor 255, carrier wave generator 256, comparator 258, PWM signal generator 259, reference voltage (VREF) generator 260, second adder 261, second control processor 262, first switch (SW) 263, general controller 264, second switch (SW) 265, reference current (IREF) generator 266, and third adder 267.

The control device 25 which has the configuration described above can be configured by a computer, for example, a digital signal processor (DSP).

For example, in the control device 25, the parts for performing complex processing and judgments can be configured by a computer or DSP and other parts can be configured by hardware circuits.

For example, the carrier wave generator 256, PWM signal generator 259, VREF generator 260, and IREF generator 266 can be configured by hardware circuits, and the other parts concerned with the control processing and judgments, for example, the multiplier 252, maximum power detector 253, holding circuit 253a, first adder 254, first control processor 255, comparator 258, second adder 261, second control processor 262, first SW 263, general controller 264, second SW 265, and third adder 267, can be realized by software or a program using a computer.

The holding function of the circuit explained above can be realized by a register or memory circuit as a hardware circuit and can be realized by the memory of a computer as a computer.

Below, the case where, as explained above, the control device 25 is realized by efficiently splitting the functions between hardware circuits and software using a computer will be exemplified.

The processing functions of the computer at that time will be explained with reference to the flow chart of FIG. 4.

The basic operations of the parts will be explained below.

As illustrated in FIG. 2 and FIG. 3, the general controller 264 controls the operation of the control device 25 as a whole.

For example, the general controller 264 performs an operation of judging and alternately switching the maximum power detection mode (or I-V scan mode) (FIG. 2, FIG. 3, step 1) or the tracking operation mode (FIG. 2, FIG. 3, step 2), starting or stopping of the circuit to be operated in response to these modes, and other processing.

The control device 25, in the maximum power detection mode at step 1, performs an operation of detecting (searching for) the maximum power Pmax of the PV 11 under the sunlight conditions at that time and detecting the optimal operation voltage $V_{OP}$ corresponding to the maximum power Pmax.

The control device 25, in the tracking operation mode at step 2, operates to controls the power converter circuit 24 so as to maintain the optimal operation voltage $V_{OP}$ which was detected in the maximum power detection mode.

The ADC 251 converts the output voltage $V_{PV}$ of the PV 11 which was detected by the voltmeter 12 to a digital signal. Simultaneously, the ADC 251 converts the output current $I_{PV}$ which was detected by the ammeter 13 to a digital signal.

The digital voltage $V_{PV}$ which was converted in the ADC 251 is supplied to the multiplier 252, the second (negative pole) terminal of the first adder 254, and the second (negative pole) terminal of the second adder 261.

The digital current $I_{PV}$ which was converted at the ADC 251 is supplied to the multiplier 252.

The multiplier 252 multiplies the digitalized output voltage $V_{PV}$ and the digitalized output current $I_{PV}$ to calculate the output power $P_{PV}$ of the PV 11 in a digital format Step 1, Maximum Power Detection Mode (FIG. 2, FIG. 3)

The maximum power detector 253 monitors the power $P_{PV}$ which was calculated in the multiplier 252, detects the maximum power Pmax which is illustrated in FIG. 2E, calculates the optimal output voltage $V_{OP}$ corresponding to the maximum power Pmax illustrated in FIG. 2D, and outputs the optimal output voltage $V_{OP}$ to the holding circuit 253a to hold it. Details of the content of this processing will be explained with reference to FIG. 2 and FIG. 4.

The holding circuit 253a is a circuit for holding the optimal output voltage $V_{OP}$ which as calculated in the maximum power detector 253 and is configured by for example a circuit having a register function and the memory in the computer.

The optimal output voltage $V_{OP}$ which is held in the holding circuit 253a is used as a reference signal in the tracking operation mode.

The adder 254 subtracts the voltage $V_{PV}$ which was supplied to the second input terminal from the optimal voltage $V_{OP}$ which is supplied from the holding circuit 253a to the first input terminal and outputs the thus calculated difference signal ($V_{OP}-V_{PV}$) to the control processor 255.

The control processor 255 performs for example a proportional (P) control operation, preferably further performs an integration (I) control operation, on the difference signal ($V_{OP}-V_{PV}$) which is output from the adder 254, calculates a second reference wave signal Vref2 for PWM control, and outputs the result to the second input terminal "b" of the SW 263.

Step 2, Tracking Operation Mode

In the tracking operation mode, when the general controller 264 (or maximum power detector 253) makes the SW 263 select the second input terminal "b", the second reference wave signal Vref2 which was calculated in the control processor 255 is supplied to the first input terminal of the comparator 258.

The carrier wave generator 256 generates a sawtooth-shaped waveform (or triangular waveform) carrier wave pulse signal $V_C$ exemplified in FIG. 2B, which iterates by a predetermined period and which changes to "0" or decreases with a predetermined inclination when each waveform increases from "0" with a predetermined inclination and reaches the maximum, and supplies this to the second input terminal of the comparator 258 for PWM control.

A sawtooth-shaped waveform (or triangular waveform) carrier wave pulse signal $V_C$ is used in this way for making the PWM signal generator 259 generate a signal having a pulse width in accordance with the level when the comparator 258 compares the above signal with the level of the second reference wave signal Vref2 or first reference voltage signal vref1 which will be explained later.

The comparator 258 compares the levels of the second reference wave signal Vref2 or first reference voltage signal Vref1 and the carrier wave pulse signal $V_C$.

When the level of the carrier wave pulse signal $V_C$ is lower than the second reference wave signal Vref2 or first reference voltage signal Vref1, the comparator 258, for example, outputs a low level signal to the PWM signal generator 259. On the other hand, when the level of the carrier wave pulse signal $V_C$ is higher than the second reference wave signal Vref2 or first reference voltage signal Vref1, the comparator 258, for example, outputs a high level signal to the PWM signal generator 259.

The change of logic level of the comparison result signal which is output from the comparator 258 defines the on/off duty ratio of a PWM control signal S259.

The PWM signal generator 259, as illustrated in FIG. 2C, for example, supplies a high level (on level) PWM control signal S259 to the gate of the MOSFET 242 of the power converter circuit 24 when the output signal of the comparator 258 has a low level, while supplies a low level (off level) PWM control signal S259 to the gate of the MOSFET 242 of the power converter circuit 24 when the output signal of the comparator 258 has a high level.

When the gate of the MOSFET 242 in the power converter circuit 24 is supplied with a high level PWM control signal, the MOSFET 242 becomes ON in state and short-circuits the node N1 and node N2 at the two ends of the MOSFET 242. As a result, the capacitor 244 exhibits a discharge state, and the inter-terminal voltage of the nodes N3 and N4 falls.

On the other hand, when the gate of the MOSFET 242 is supplied with a low level PWM control signal, the MOSFET 242 becomes OFF and opens the circuit between the node N1 and the node N2 in the power converter circuit 24. As a result, the output voltage $V_{PV}$ of the PV 11 is stored in the capacitor 244 by a time constant of the LC circuit of the inductor 241 and capacitor 244 in the power converter circuit 24. As a result, the voltage is boosted in the capacitor 244.

In this way, the control device 25 suitably controls the MOSFET 242 in the power converter circuit 24 by the PWM modulation method in line with the state of the PV 11 and supplies the desired power to the load 16.

The VREF generator 260 and IREF generator 266, in the optimal power detection mode, for example, generate the reference current signal Iref and reference voltage signal Vref0 which are illustrated in FIG. 2A.

In the time period t0 to t1 which is illustrated in FIG. 2, the reference current signal Iref which is output from the IREF generator 266 is "0". At the point t1, it is the open-circuit voltage $V_{OC}$. After that, for an elapsed time "t" during the time period from the point t1 to t3, when the time period from t1 to t3 is defined as the time $t_D$, the VREF generator 260 generates the reference voltage Vref0 which is defined by the following equation.

Reference current Iref0=0 time period t0 to t1

Reference voltage $Vref0 = V_{OC} - (V_{OC}/t_D) \times t$ time period t1 to t3       (1)

The third adder 267, in the time period t0 to t1, computes a difference (Iref0-$I_{PV}$) between the reference current signal Iref0 which is supplied from the IREF generator 266 and the output current $I_{PV}$ which is output from the ADC 251. The result of computation passes through the second SW 265 and is supplied to the second control processor 262.

The second adder 261, in the time period t1 to t3, computes a difference ($V_{PV}$-Vref0) between the reference voltage signal Vref0 which is supplied from the VREF generator 260 and the output voltage $V_{PV}$ which is output from the ADC 251.

The result of computation passes through the second SW 265 and is supplied to the second control processor 262.

The general controller 264 switches the second SW 265 at the above timings t0 to t1 and t1 to t3.

The second control processor 262 performs proportional (P) processing, preferably further performs integration (I) processing, on the signal of the current difference (Iref0-$I_{PV}$) which was output from the adder 261 in the time period t0 to t1 and on the signal of the voltage difference ($V_{PV}$-Vref0) which was output from the adder 261 in the time period t1 to t3 so as to generate the first reference voltage signal Vref1 and supplies the result to the input terminal "a" of the SW 263.

In the maximum power detection mode, when the first input "a" of the SW 263 is selected by the general controller 264, the first reference voltage signal Vref1 which was output from the control processor 262 is compared with the carrier wave pulse signal Vc which was output from the carrier wave generator 256 in the comparator 258. Based on the result of comparison, the PWM signal generator 259 generates the PWM control signal 5259 and supplies this to the gate of the MOSFET 242.

In the two modes of the maximum power detection mode and the tracking operation mode, the general controller 264, ADC 251, comparator 258, carrier wave generator 256, and PWM signal generator 259 operate.

In the maximum power detection mode, the ADC 251, multiplier 252, maximum power detector 253, VREF generator 260, IREF generator 266, adders 261 and 267, control processor 262, SW 263 (first input terminal "a"), comparator 258, carrier wave generator 256, PWM signal generator 259, and SW 265 operate.

On the other hand, in the tracking operation mode, the holding circuit 253a, adder 254, SW 263 (second input terminal "b"), comparator 258, carrier wave generator 256, and PWM signal generator 259 operate.

Mode Judgment and Switching

As exemplified in FIG. 2 and FIG. 4, for example, under the control of the general controller 264, the operation in the maximum power detection mode and the operation in the tracking operation mode are alternately carried out.

The judgment of the start and end of the maximum power detection mode and the judgment of switching between the maximum power detection mode and the tracking operation mode can be carried out by the general controller 264.

As illustrated at step 22 of FIG. 4, the maximum power detection mode and the tracking operation mode can be switched by the general controller 264 can be automatically switched by, for example, a predetermined period, for example, each second. Alternatively, the general controller 264 monitors the change of the voltage $V_{PV}$ of the PV 11 or the power calculated in the multiplier 252 in the tracking operation mode and switches the operation from the tracking operation mode to the maximum power detection mode when the change of the voltage $V_{PV}$ or power is large. In the maximum power detection mode, the maximum power Pmax and the optimal output voltage Vop corresponding to that are obtained. When the maximum power detection mode ends, the operation can be switched to the tracking operation mode.

Details of the operation in the maximum power detection mode and the operation in the tracking operation mode will be explained later.

Operation in Optimal Power Detection Mode

Below, the control operation by the control device 25 in the maximum power detection mode in the time period of T1 to T2 in FIG. 2 will be explained.

Point t0, Start Processing of Maximum Power Detection Mode (FIG. 4, step 11)

At the start point t0 of the maximum power detection mode at which the operation switches from the tracking operation mode to the maximum power detection mode, the general controller 264 selects the first input terminal "a" of the SW 263 and makes it supply the first reference voltage signal Vref1 from the control processor 262 to the comparator 258.

The general controller 264 makes the VREF generator 260 and IREF generator 266 operate. The IREF generator 266 outputs the reference current signal Iref0=0 in the time period t0 to t1. In the time period t1 to t3, the VREF generator 260 outputs as the reference voltage signal Vref0 the reference voltage signal Vref0 which is defined by equation (1) and has the waveform illustrated in FIG. 2A.

The reference signal is comprised of a reference current which is "0" during the term from the point t0 to t1 and the reference voltage which falls to "0" with a constant inclination from the open-circuit voltage $V_{OC}$ during the term from the point t1 to t3.

The reference current is the reference current for making the MOSFET 242 operate so as to open the circuit of the output terminals TO1 and TO2 of the PV 11.

The reference voltage is a signal which is changed so that when the open-circuit voltage $V_{OC}$ between the output terminals TO1 and TO2 of the PV 11 is detected, as illustrated in FIG. 2D, the output voltage $V_{VP}$ of the PV 11 decreases from that open-circuit voltage $V_{VC}$ to the voltage ($V_{PV}$=0) at the time when the output terminals TO1 and TO2 short-circuit and falls with an inclination of $-(V_{OC}/t_D)$.

The adder 267 computes the difference (Iref0–$I_{PV}$) between the reference current signal Iref0 which is supplied from the IREF generator 266 and the output current $I_{PV}$ which is output from the ADC 251 in the time period t0 to t1.

Further, in the time period t1 to t3, the adder 261 computes the difference ($V_{PV}$–Vref0) between the reference voltage signal Vref0 which is supplied from the VREF generator 260 and the output voltage $V_{PV}$ which is output from the ADC 251.

The control processor 262 performs proportional (P) processing, preferably further performs integration (I) processing, on the (Iref0–$I_{PV}$) or ($V_{PV}$–Vref0) which is input through the SW 265 and supplies the result of processing as the first reference voltage signal Vref1 via the first input/output terminal "a" of the SW 263 to the comparator 258.

The comparator 258 compares in level the first reference voltage signal Vref1 which was output from the control processor 262 and the carrier wave pulse signal Vc which is output from the carrier wave generator 256 which is illustrated in FIG. 2B. As illustrated in FIGS. 2B and 2C, it outputs for example a low level signal to the PWM signal generator 259 when the level of the carrier wave pulse signal Vc is lower than the first reference wave signal Vref1, while outputs for example a high level signal to the PWM signal generator 259 when the level of the carrier wave pulse signal Vc is higher than the first reference wave signal vref1.

The PWM signal generator 259, as illustrated in FIG. 2C, for example, supplies a high level (ON level) PWM control signal S259 to the gate of the MOSFET 242 of the power converter circuit 24 only in the case where the output signal of the comparator 258 is at the low level.

Detection of Open-Circuit Voltage During Term from Point t0 to t1 (FIG. 4, step 12)

During the term from the point t0 to t1, the value of the reference current signal Iref is "0", therefore the output signal of the adder 267 becomes "negative", and the output signal of the control processor 262, that is, the reference voltage signal Vref1, decreases.

When the reference voltage signal Vref1 is low, the PWM signal generator 259, as illustrated in FIG. 2C, outputs a PWM signal which sets the MOSFET 242 to the first logic state, for example, the "open" state. As a result, the output terminals TO1 and TO2 of the PV 11 are opened in circuit, the output voltage $V_{PV}$ rises as illustrated in FIG. 2D, and, on the other hand, the output current $I_{PV}$ and output power $P_{PV}$ decrease as illustrated in FIGS. 2D and 2E.

The maximum power detector 253 continuously monitors the output current $I_{PV}$ (or output power $P_{PV}$) from the point t0 at which the maximum power detection mode starts. At the point t1, it detects the output voltage $V_{PV}$ at the time when the output current $I_{PV}$ (or output power $P_{PV}$) becomes "0" or almost "0" as the open-circuit voltage $V_{OC}$ at the time when the output terminals TO1 and TO2 are open in circuit and outputs it to the VREF generator 260.

The VREF generator 260 holds the open-circuit voltage $V_{OC}$.

At the point t1, when the output terminals TO1 and TO2 have become open in circuit, upon instruction of the general controller 264, the VREF generator 260 outputs the voltage signal Vref0 illustrated in FIG. 2A which falls from the open-circuit voltage $V_{OC}$ with an inclination defined by Equation (1) along with passing of the time "t".

From Period t1 to Period t3, Maximum Power Detection Period (FIG. 4, step 13)

During the term from the period t1 to period t3, the adder 261 computes the difference between the reference voltage signal Vref0 which is output from the VREF generator 260 and falls with a constant inclination and the output voltage $V_{PV}$ which is output from the ADC 251 at that time.

The control processor 262 performs control processing in accordance with the differential voltage and supplies the result as the second reference voltage signal Vref1 through the SW 263 to the comparator 258.

The comparator 258 and PWM signal generator 259 generate the PWM signal illustrated from the point t1 in FIG. 2C in accordance with the voltage difference ($V_{PV}$–Vref0). The MOSFET 242 is then controlled by the PWM method.

As a result, the output voltage $V_{PV}$ falls in response to the reference voltage signal Vref0.

The maximum power detector 253 monitors the power $P_{PV}$ which is output from the multiplier 252 from the point of time t1 and detects the maximum power $P_{max}$ showing the maximum power $P_{PV}$.

When detecting the maximum power $P_{max}$, the maximum power detector 253 detects the output voltage $V_{PV}$ of the PV 11 corresponding to the maximum power $P_{max}$ as the optimal output voltage Vop and stores this in the holding circuit 253a.

End of Maximum Power Detection Mode (FIG. 4, Step 14)

The general controller 264, for example, detects at the point t3 that the output voltage $V_{PV}$ falls to "0" (or the output power $P_{PV}$ becomes "0") and the output terminals TO1 and TO2 short-circuit. At that time, it switches the operation from the maximum power detection mode to the tracking operation mode.

Tracking Operation Mode (FIG. 4, Step 21)

The general controller 264, at the point t3, switches the SW 263 to the second input terminal "b" side as the end of the maximum power detection mode of the time period T1 to T2 and the start of the tracking operation mode.

Due to this, in the first adder 254, the differential voltage between the optimal output voltage Vop which is supplied from the holding circuit 253a and the voltage $V_{PV}$ which is supplied from the ADC 251 is calculated. Based on the result of calculation, the second reference voltage signal Vref2 which is obtained by processing control in the control processor 255 is supplied via the SW 263 to the comparator 258.

The method of generation of the PWM control signal 5259 by the comparator 258 and PWM signal generator 259 is as explained above.

Due to this, in the tracking operation mode, the output voltage $V_{PV}$ of the PV 11 is controlled so as to maintain the optimal output voltage Vop which is supplied from the optimal voltage holding circuit 253a.

Judgment of End of Tracking Mode (FIG. 4, Step 22)

Switching between the maximum power detection mode and the tracking operation mode by the general controller 264 can be automatically performed at for example a predetermined period, for example, every second. Alternatively, the general controller 264 monitors the change of the voltage $V_{PV}$ of the PV 11 or the power which was calculated by the multiplier 252 in the tracking operation mode and switches the operation from the tracking operation mode to the maximum power detection mode when the change of the voltage $V_{PV}$ or power is large.

In this way, according to the first embodiment of the present invention, by repeatedly operating the detection operation of the maximum power point and tracking operation as one cycle (detection period T, for example, 1 second), the voltage can be boosted to the optimal voltage at the maximum power point Pmax of the PV 11 at that time.

As explained above, the inductor 241 in the power converter circuit 24 only functions as a DC-DC converter and does not use the discharge characteristic of the inductor at the time of detection (identification) of the maximum power Pmax and optimal operation voltage Vop. Accordingly, it is not necessary to provide an inductor for the detection (identification) of the maximum power Pmax and/or optimal operation voltage Vop in the power converter circuit 24 in the first embodiment of the present invention. As a result, according to the first embodiment, it is possible to use not only the DC-DC converter 24 illustrated in FIG. 1, but also the various types of power converting means which will be explained later.

Further, the control device 25 of the first embodiment can perform the same control processing as that described above even in the case of use of these various types of power converting means.

Note that, in the first embodiment, the load 16 is adjusted so that the load voltage becomes constant at substantially 25V by connecting two 12V batteries of in series and connecting a 100 W light bulb parallel to these.

Modification (1) of First Embodiment

When configuring the multiplier 252 by a hardware circuit, for example analog processing circuit, the ADC 251 is unnecessary. The analog voltage Vpv which was detected by the voltmeter 12 and the analog current $I_{PV}$ which was detected at the ammeter 13 can be directly multiplied by the analog circuit multiplier 252 to calculate the power $P_{PV}$. In this case, an A/D converter (ADC) is provided at the output side of the multiplier 252, and digital power $P_{PV}$ is output to the maximum power detector 253.

Modification (2) of First Embodiment

A DC wattmeter can also be provided between the output terminals TO1 and TO2 of the PV 11 to directly measure the power of the PV 11. In that case, the multiplier 252 which multiplies the voltage and current to calculate the power and the ammeter 13 are unnecessary.

In this case, the ADC 251 outputs the voltage which was measured by the voltmeter 12 to the adder 254 and adder 261 in the same way as the case explained above. On the other hand, the ADC 251 converts the power which was measured by the DC wattmeter to a digital value which it then supplies to the maximum power detector 253.

Second Embodiment

Example of Case of Mixing

Figure 5:
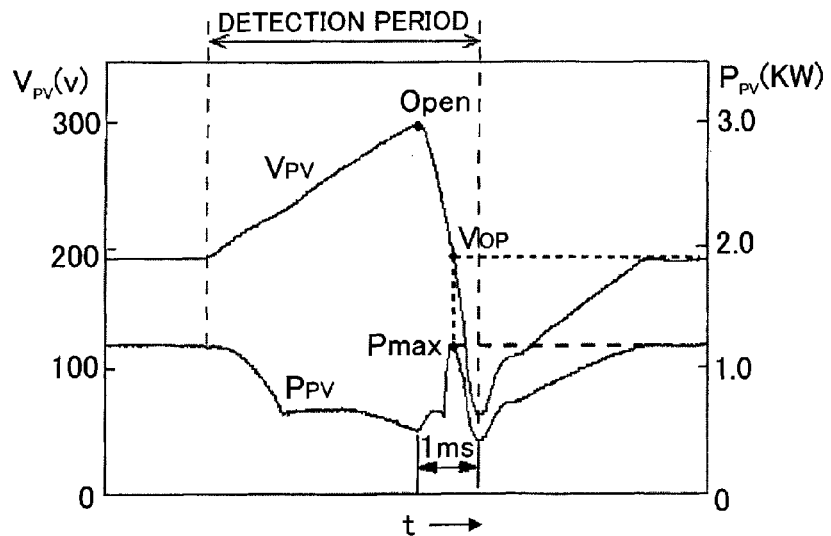
FIG. 5 A waveform diagram in a case where two different types of panels are used as the solar cell panels (mixing case).

The second embodiment which is illustrated in FIG. 5 shows an example of a case of using two different types of panels as the PV 11 (case of mixing).

In the maximum power detection mode, for example, there are two peak powers in a short judgment time of 1 ms. The first peak power is small, and the next peak power is the maximum power Pmax.

The control device 25, in the maximum power detection mode, gradually raises the output voltage Vpv of the PV 11, monitors the voltage Vpv at that time, and detects the open-circuit state (FIG. 4, step 12).

Next, the control device 25, using the reference voltage signal Vref0, lowers the output voltage Vpv of the PV 11 from the open-circuit voltage VOC with a constant inclination to gradually lower it. In this process (time period), it continuously monitors the output voltage. When detecting power having a plurality of peaks, it detects the maximum power Pmax showing the maximum peak and detects the optimal operation voltage Vop corresponding to this maximum power Pmax (FIG. 4, step 13).

Further, in the tracking operation mode, it performs a control operation which tracks the optimal operation voltage Vop (FIG. 4, step 21).

In this way, even if the PV 11 is configured mixed, according to this embodiment of the present invention, it is possible to perform the processing at step 13 of FIG. 4 by selecting the maximum peak among the plurality of peaks by the method explained above to thereby accurately detect the maximum power Pmax. As a result, in the tracking operation mode, in the same way as the first embodiment, it is possible to perform the tracking operation based on the optimal voltage Vop corresponding to that maximum power Pmax.

Modification of Second Embodiment

In the case where the PV 11 explained above uses two different types of panels, that is, the case of so-called mixing, it is possible to use the method of the second embodiment explained above to detect the optimal operation voltage Vop which corresponds to the maximum power Pmax and to use the detected optimal operation voltage Vop to correct the operation point of the conventional hill-climbing method.

Third Embodiment (Case of Partial Shadow)

Figure 6:
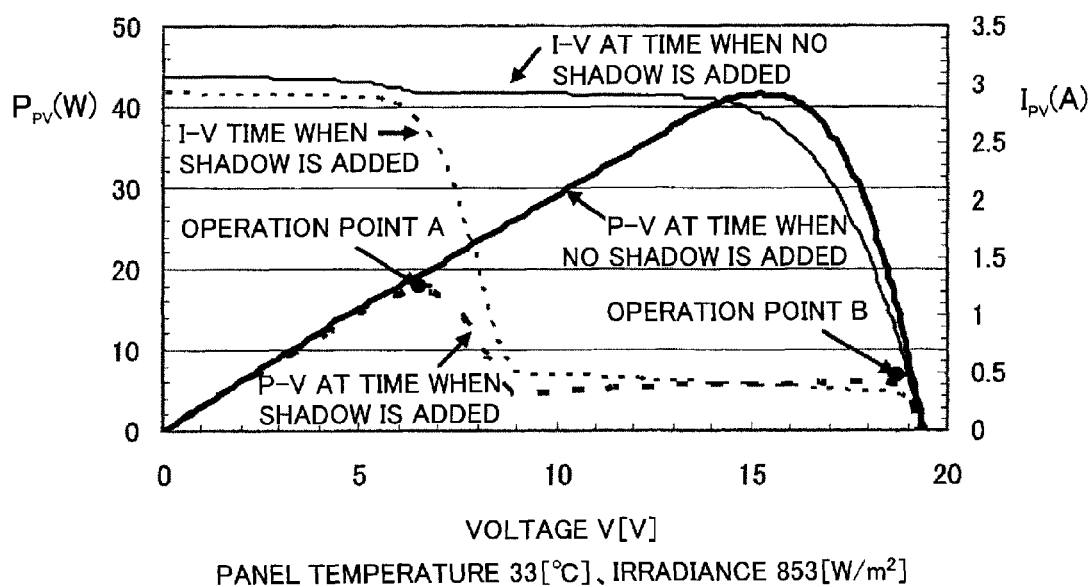
FIG. 6 A graph showing I-V and P-V characteristics of a solar cell in a state of no shadow and when a partial shadow is added.

FIG. 6 is a diagram which shows the I-V and P-V characteristics of a solar cell in the state where there is no shadow indicated by a broken line and at the time when a partial shadow indicated by a wide broken line is added.

In this embodiment (experiment), a shadow is added to one cell of one solar cell module whereby two output peaks are generated. It is seen that the maximum power point when adding a partial shadow is at the low voltage side (operation point A). The operation point in the case of no shadow was indicated by B.

Figure 7A:
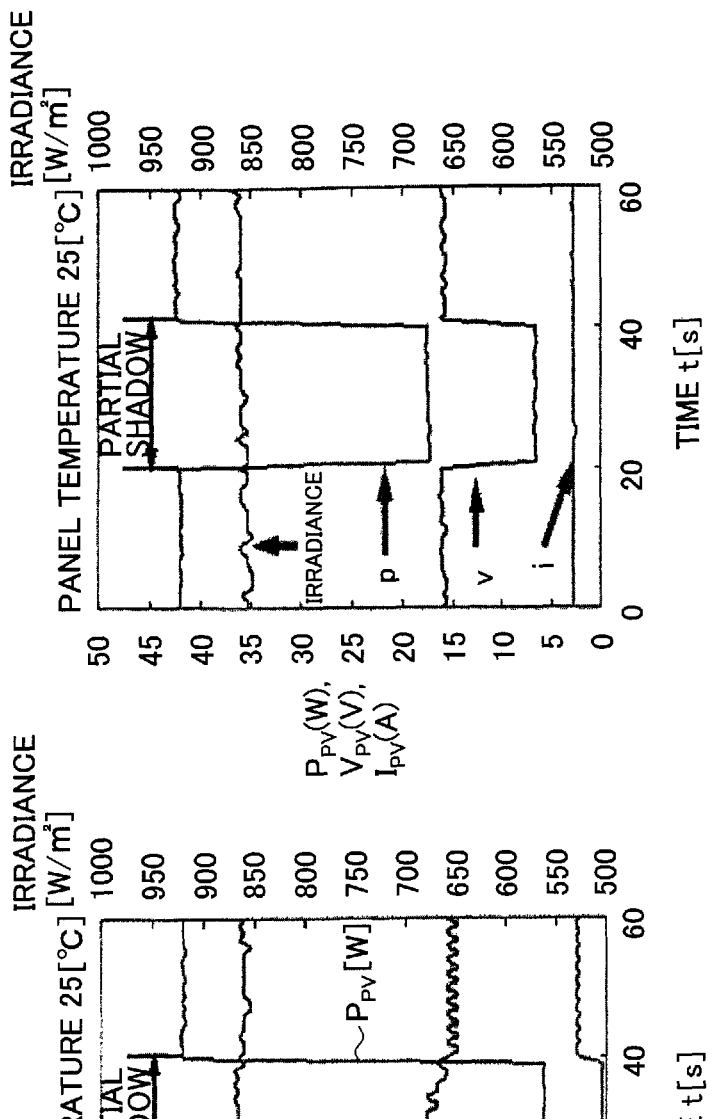
FIGS. 7A and 7B are diagrams showing results which are measured by a data logger when executing a hill-climbing method and an I-V instantaneous scan method in the present embodiment in accordance with presence/absence of a partial shadow.
Figure 7B:
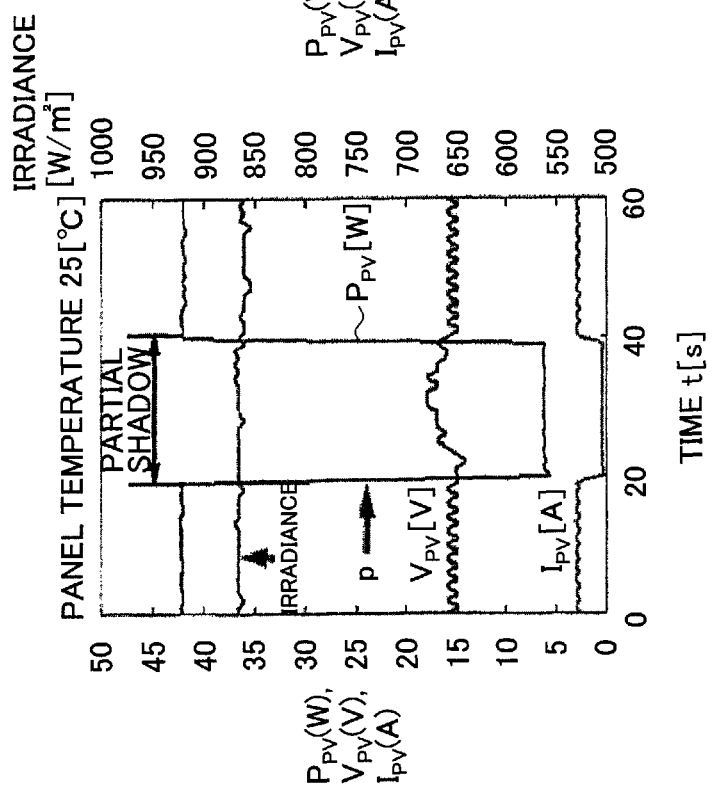

FIGS. 7A and 7B are diagrams showing results of measurement by a data logger when performing the hill-climbing method and IV instantaneous scan method.

The results according to the hill-climbing method which is illustrated in FIG. 7A show that the tracking operation was unstably performed near the flat operation point B (about 6 W) on the high voltage side which is illustrated in FIG. 6 in the P-V characteristic when adding a partial shadow.

Contrary to this, the results according to the "IV instantaneous scanning method" of the present embodiment which is illustrated in FIG. 7B show that the tracking operation was reliably carried out at the maximum output operation point A (about 17 W) on the low voltage side illustrated in FIG. 6. The output becomes about 2.8 times greater.

The third embodiment has the advantage that the detection time of the IV characteristic can be freely set in the general controller 264 as well.

Modification of Third Embodiment

In the case where a partial shadow is added to the PV 11, according to the method of the third embodiment explained above, it is also possible to detect the optimal operation voltage Vop and use the detected optimal operation voltage Vop to correct the operation point of the conventional hill-climbing method.

Effects of First to Third Embodiments

The results obtained by performing the same experiment as that in the invention disclosed in PLT2 will be explained for the photovoltaic power generation systems of the first to third embodiments.

Figure 8:
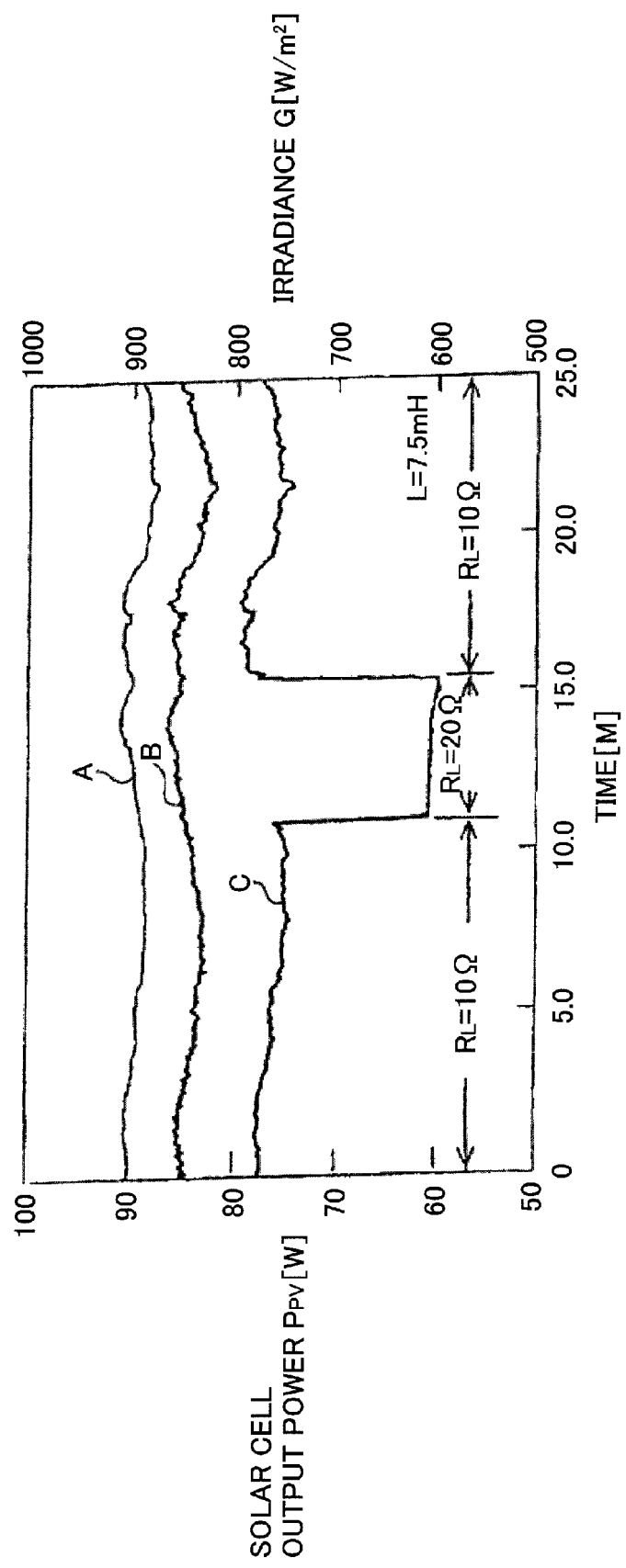
FIG. 8 A diagram showing a response characteristic according to the present embodiment when the load is made a pure resistance, the value thereof is stepwise changed, and a rapid load fluctuation is given.

FIG. 8 is a diagram showing a response characteristic when making the load 16 a pure resistance RL, stepwise changing the value thereof like 10Ω→20Ω→10Ω, and giving a rapid load fluctuation.

An abscissa represents the time, a left side ordinate represents the output power of the solar cell, and a right side ordinate represents the irradiance.

A curve indicated by notation A shows the irradiance, a curve indicated by notation B shows the characteristic of the present control method, and a curve indicated by notation C shows the characteristic of the conventional method.

In the control method of the embodiment based on the present invention, compared with the method of the conventional example, power which is proportional to the irradiance can be stably taken out without being influenced by load fluctuation.

Characteristics in Case of Nightfall and Sudden Change of Irradiance

The technical crux of a solar cell panel (PV) resides in a point of how far the sunlight can be caught and power can be supplied at the time when the trackability with respect to a sudden change in the illumination by sunlight and the absolute value of illumination decrease (nightfall etc.)

Figure 9:
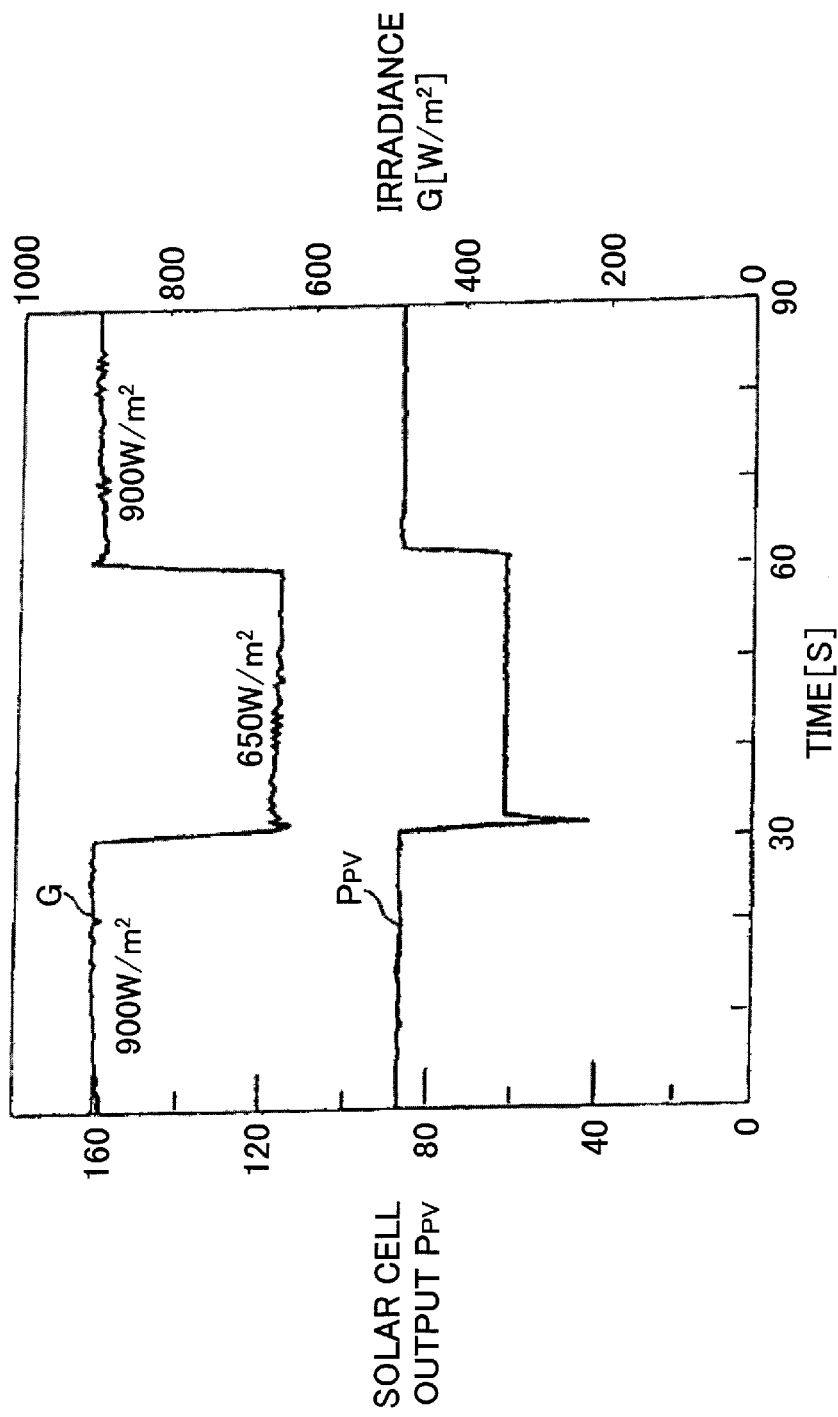
FIG. 9 A diagram showing an example of the response characteristic at the time of sudden change of irradiance according to the control method of the present embodiment.

Referring to FIG. 9, the response characteristic at nightfall and other cases where the irradiance suddenly changes will be considered.

FIG. 9 is a diagram showing an example of the response characteristic according to a control method of the embodiment of the present invention at the time of a sudden change in the irradiance. The abscissa represents the time, the left side ordinate represents the output power of the solar cell, and the right side ordinate represents the irradiance.

Figure 10:
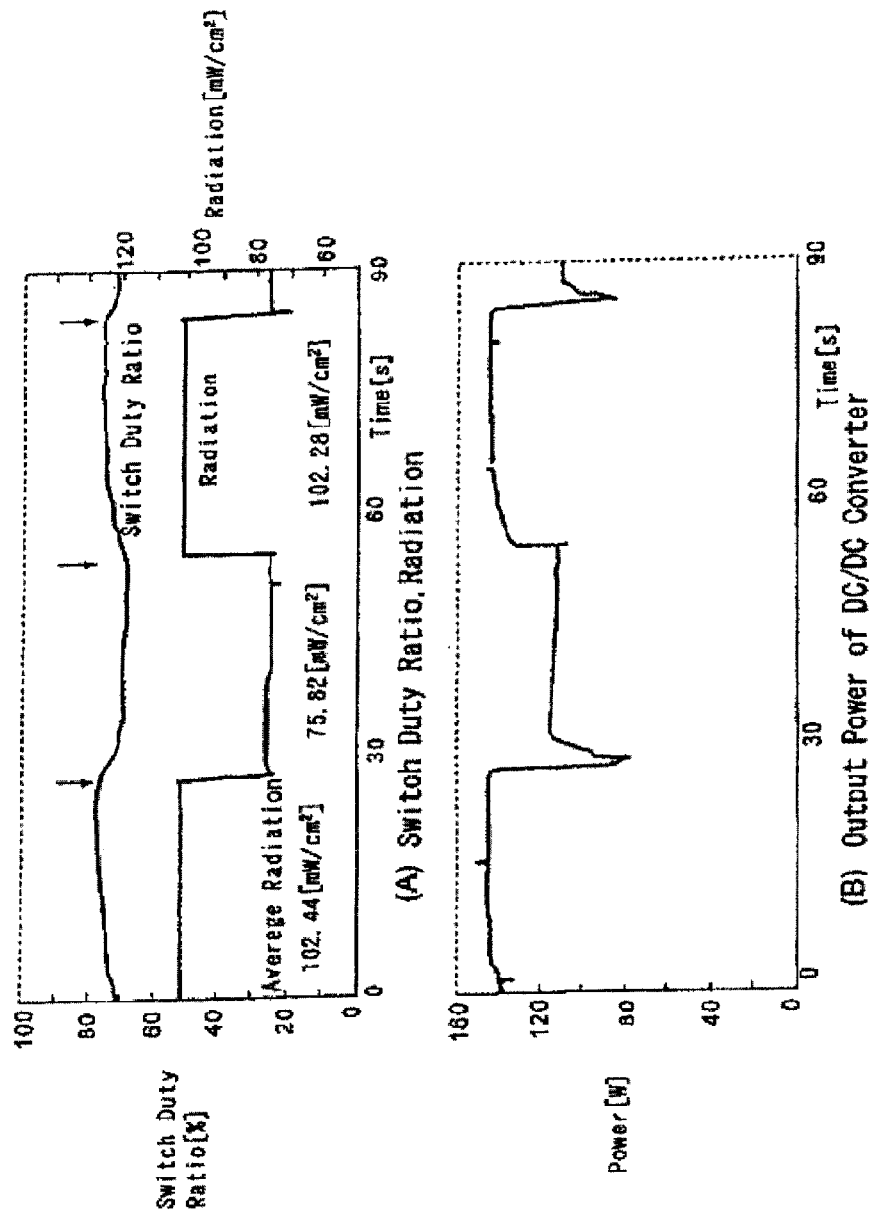
FIG. 10 A diagram for comparison with the characteristic illustrated in FIG. 9 and showing an example of the response characteristic at the time of sudden change of irradiance according to the conventional hill-climbing method.

FIG. 10 is a diagram for comparison with the results illustrated in FIG. 9 and shows an example of the response characteristic according to the hill-climbing method when the irradiance suddenly changes.

Figure 11A:
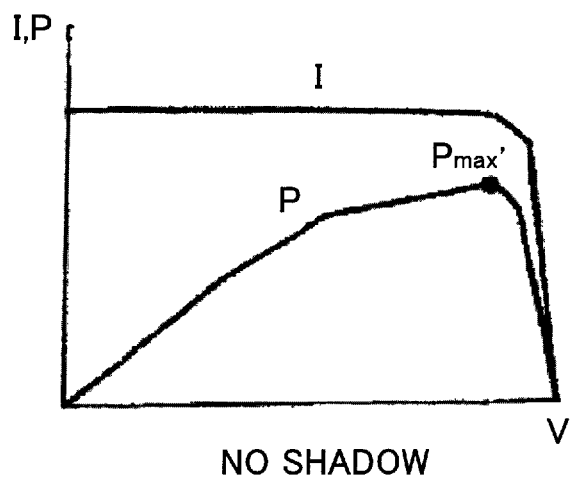
FIG. 11 Diagrams showing the tracking property of the control method of the present embodiment in a case where no shadow is formed on the solar cell panel and a case where a shadow is formed.
Figure 11B:
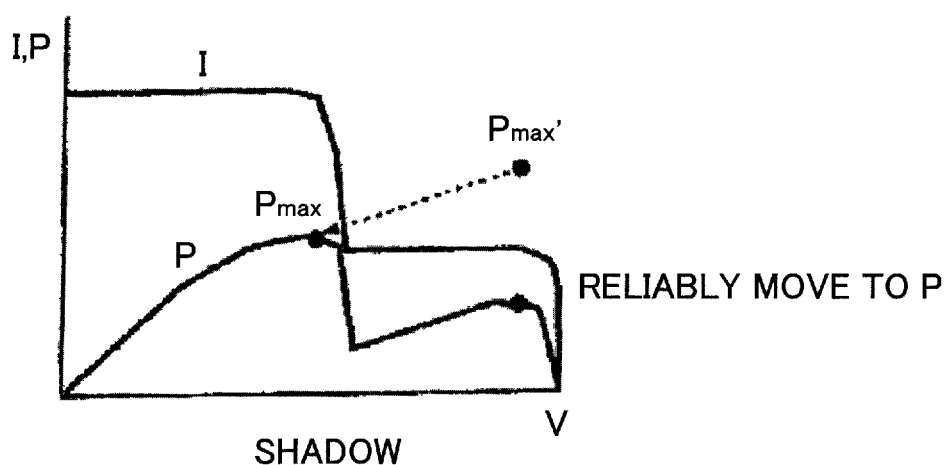

FIG. 11 is a diagram showing the tracking characteristics of the control of the embodiment of the present invention in a case where a shadow is not formed in PV (FIG. 11A) and a case where it is formed (FIG. 11B).

Figure 12A:
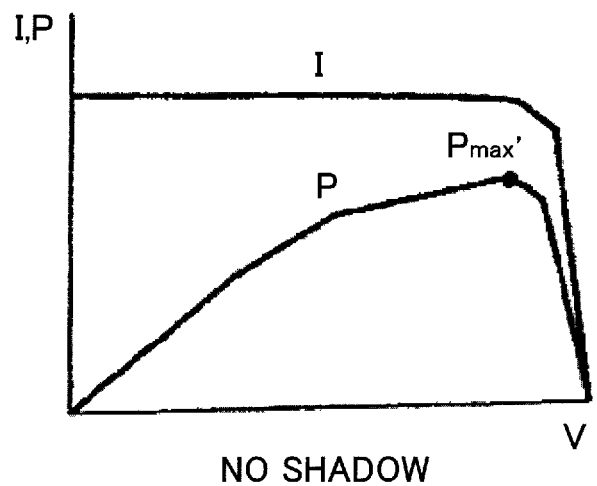
FIG. 12 Diagrams for comparison with the illustration of FIG. 11 and showing the tracking property of the conventional hill-climbing method in the case where no shadow is formed on the solar cell panel and the case where a shadow is formed.
Figure 12B:
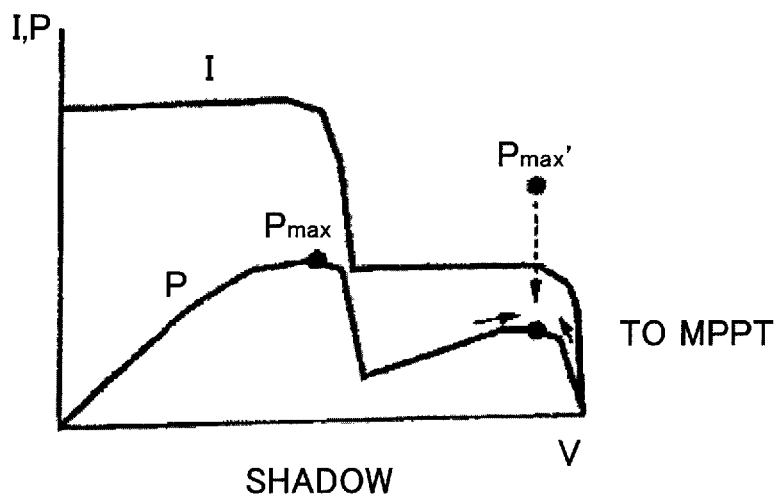

FIG. 12 is a diagram for comparison with the example illustrated in FIG. 11 and shows the tracking characteristics of the control of the present embodiment in a case where a shadow is not formed in the solar cell panel (PV) (FIG. 12A) and a case where it is formed (FIG. 12B). Note that, in FIG. 12B, the arrows on the two sides which are directed toward the maximum power Pmax' illustrate a state where the power is made to approach the maximum power Pmax'.

Figure 13:
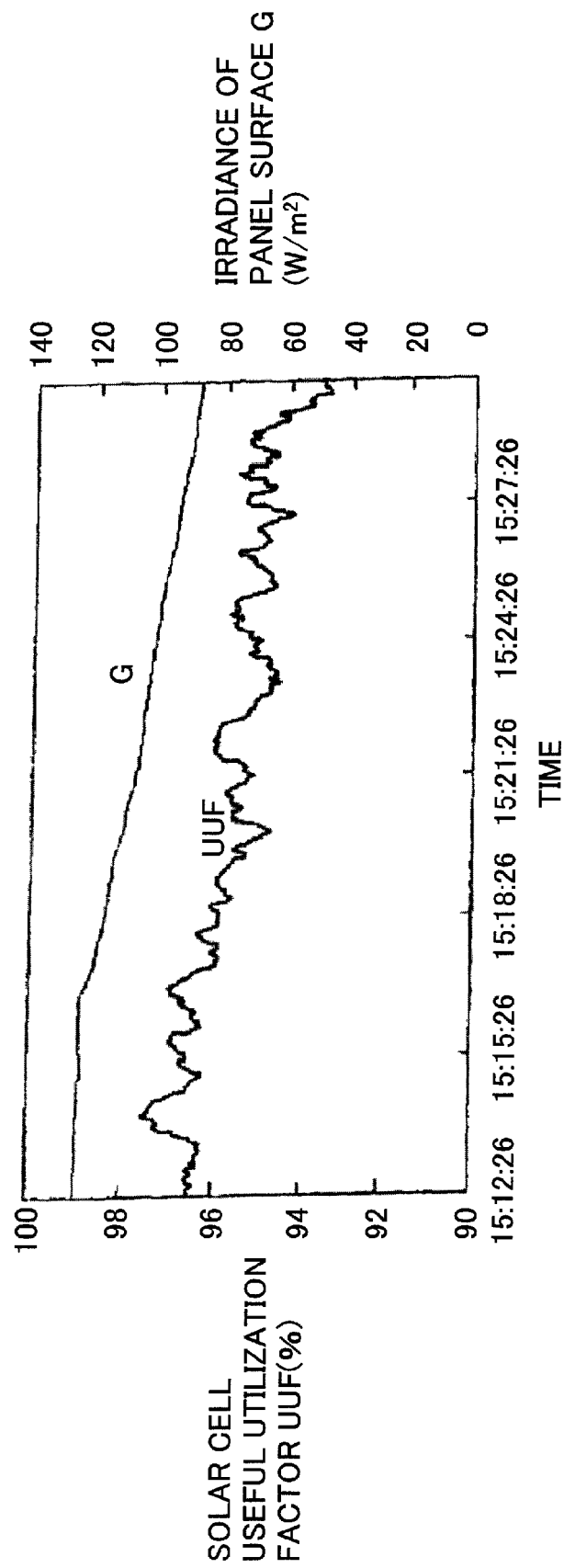
FIG. 13 A diagram showing a power acquisition performance at the time of low illumination in the control method of the present embodiment.

FIG. 13 is a diagram showing a power acquisition characteristic according to the embodiment of the present invention at the time of low illumination of the sunlight which is irradiated at the solar cell panel (PV).

The abscissa represents the time, the left side ordinate represents the useful utilization factor UUF of the solar cell representing the efficiency of the power acquisition, and the right side ordinate represents the panel surface irradiance G.

Note that, when the maximum power point detection period is T, the useful utilization factor UUF of the solar cell is given by the following equation.

$$UUF = \frac{\text{Operation point output}}{\text{Pmax point output}} \times 100 = \frac{\frac{1}{T}\int_0^T V_{PV} I_{PV}\, dt}{P_{max}} \times 100 \ [\%] \quad \text{[Equation 1]}$$

In contrast to the hill-climbing method which was performed by MPPT control, the control method of the embodiment of the present invention is excellent in all points.

Regarding the trackability of sudden change of illumination, as shown in FIG. 9, with the control method of the embodiment of the present invention, it is possible to detect the maximum power point after a change by only one scan (detection).

In the control method of the embodiment of the present invention, because a simple maximum value is detected, tracking is possible so long as there is an inclination in the full scan.

In the control method of the embodiment of the present invention, when the irradiance G is 800 W/m$_2$ at the time of a peak, the useful utilization factor UUF is maintained at 90% even if the illumination falls to 100/m$^2$.

Figure 14:
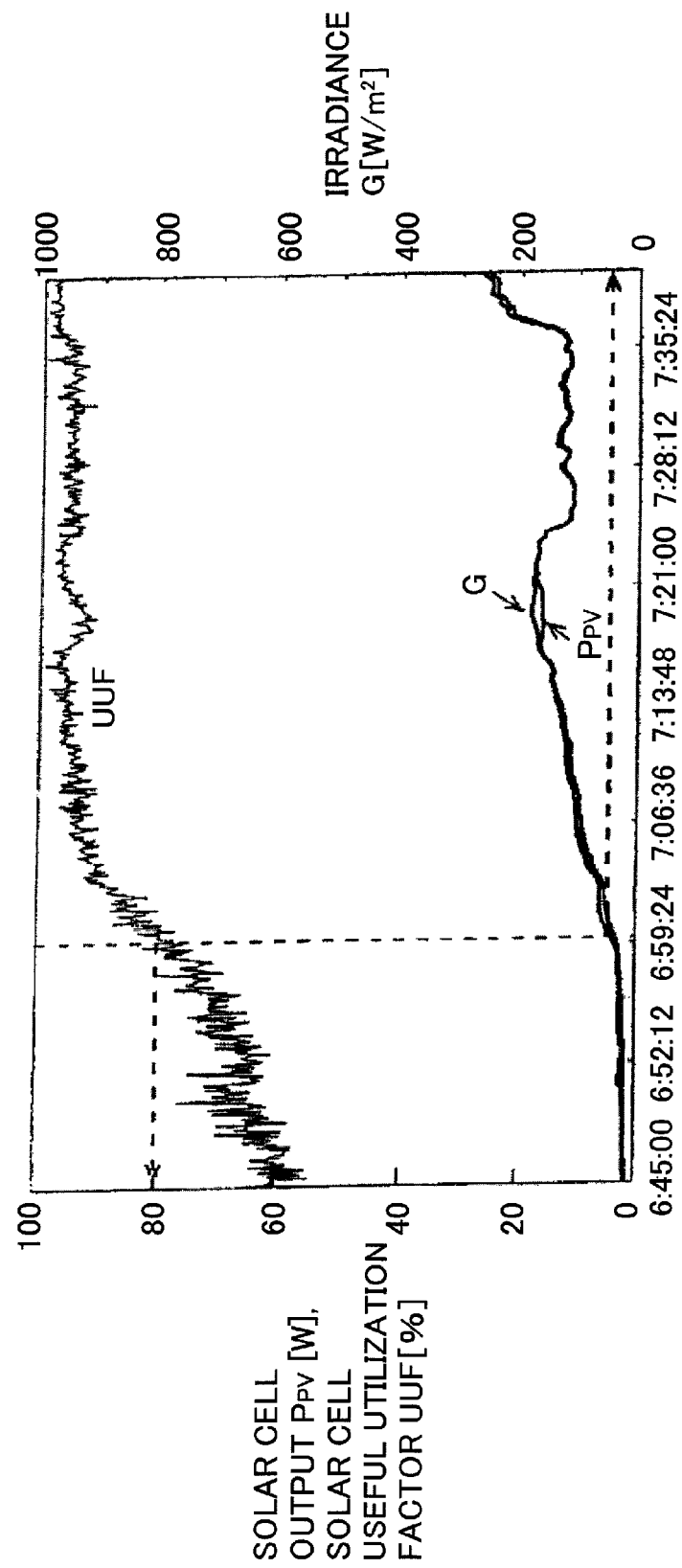
FIG. 14 A diagram showing a power acquisition characteristic at the time of low illumination in the control method of the present embodiment.

FIG. 14 is a diagram showing a power acquisition performance at the time of low illumination in the control method of the embodiment of the present invention.

The abscissa represents the time, the left side ordinate represents the output power $P_{PV}$ of the solar cell and solar cell useful utilization factor UUF, and the right side ordinate represents the irradiance G of the panel surface.

In the control method of the embodiment of the present invention, the solar cell useful utilization factor UUF shows a high efficiency such as 80% or more when the irradiance G is 50 W/m$^2$.

Further, in the control method of the embodiment of the present invention, when the irradiance G is 50 W/m$^2$ or less, the solar cell useful utilization factor UUF falls, but about 60% energy can be retrieved.

According to the embodiment, when comparing the control method of the embodiment of the present invention and the conventional method which mounts a battery control device which is widely utilized in an independent type photovoltaic power generation system for the amount of the generated power, according to the embodiment of the present invention, it was seen that the power increased by about 14.8% and a very high solar cell useful utilization factor UUF such as about 99% could be obtained.

Fourth Embodiment

Figure 15:
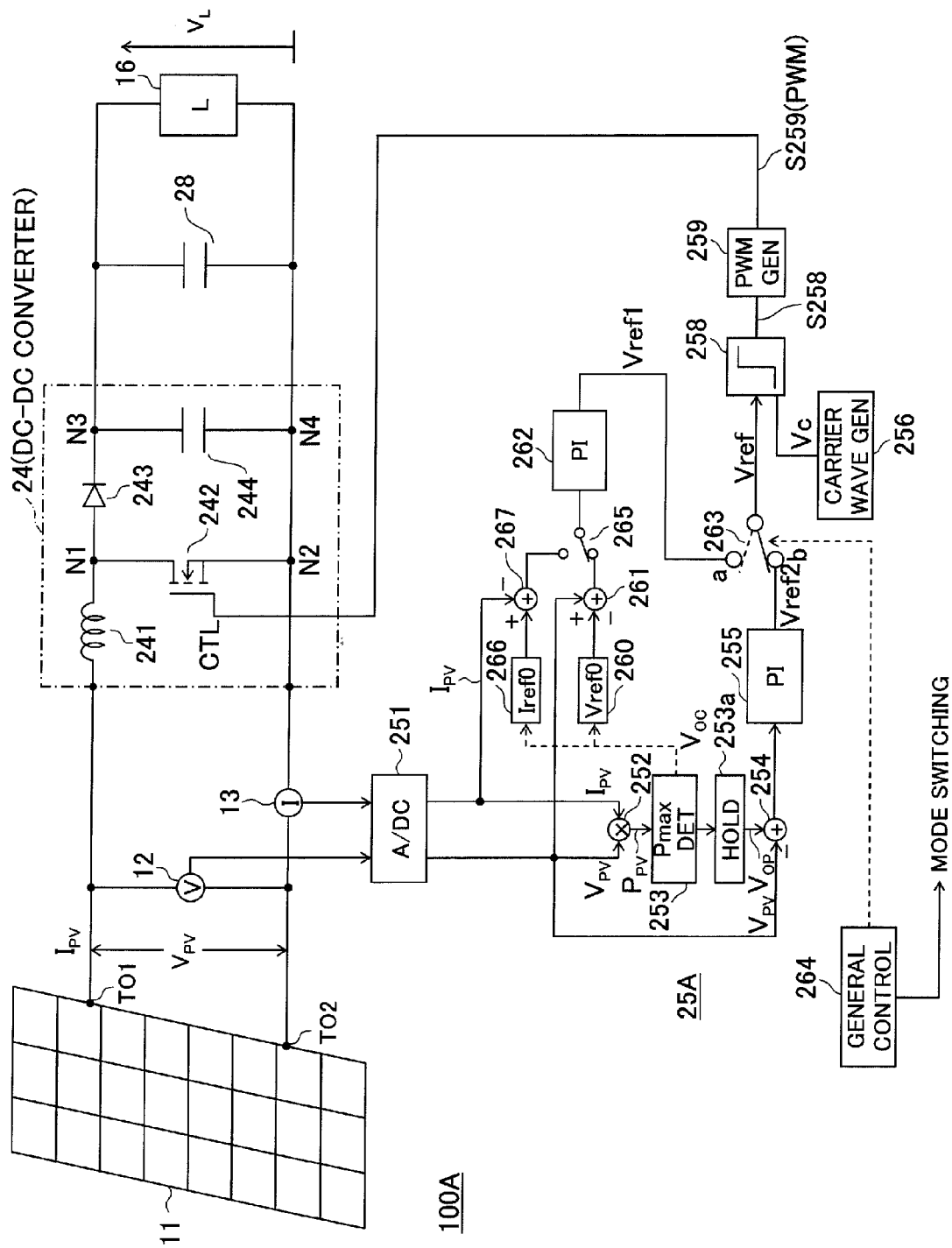
FIG. 15 A view of the configuration of a solar power generation system of another embodiment of the present invention.

FIG. 15 shows a photovoltaic power generation system 100A of a fourth embodiment of the present invention.

The photovoltaic power generation system 100A is an independent type photovoltaic power generation system.

When comparing this with the system configuration illustrated in FIG. 1, the photovoltaic power generation system 100A illustrated in FIG. 15 is provided with a battery 28.

The operations of the power converter circuit 24 and control device 25 are the same as the operations explained in the first embodiment.

By the photovoltaic power generation system 100A illustrated in FIG. 15 as well, the same results as those by the first embodiment were obtained. Accordingly, a detailed explanation thereof will be omitted.

DC-DC Converter (1)

The DC-DC converter used as the power converter circuit in the first to fourth embodiments explained above with reference to FIG. 1 was explained by taking as an example a boost type DC-DC converter. When using a boost type DC-DC converter, a higher load voltage than the voltage of the solar cell panel (PV) 11 can be obtained.

DC-DC Converter (2)

Figure 16:
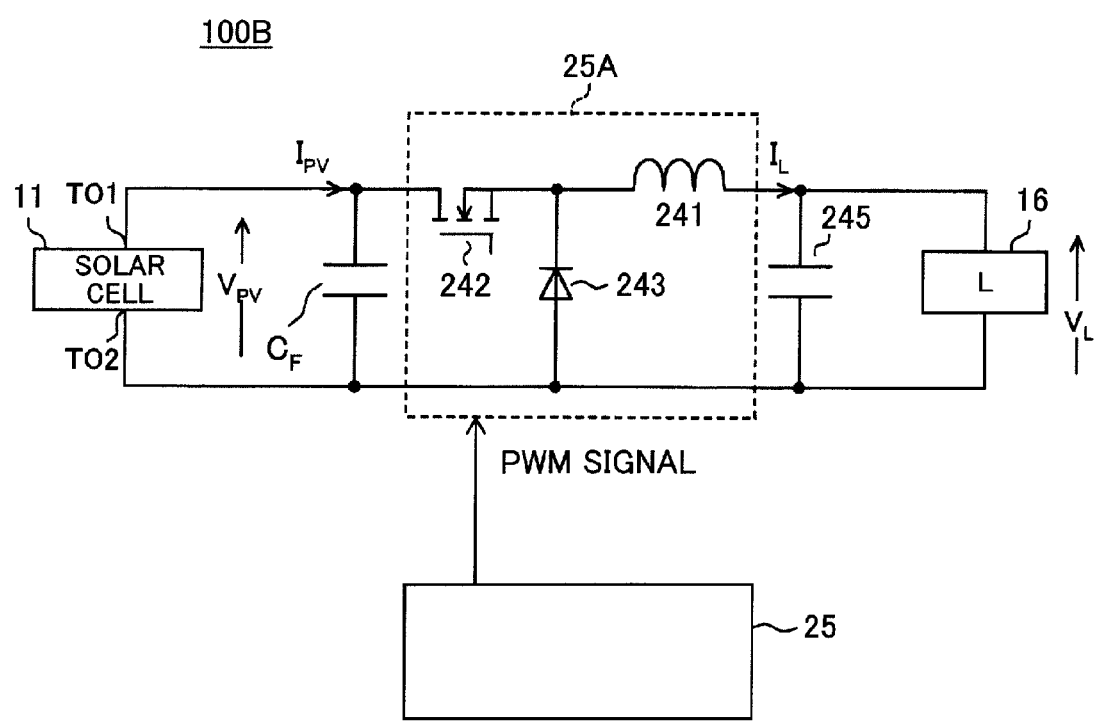
FIG. 16 A circuit diagram showing the configuration of a buck type DC-DC converter which is applied to an embodiment of the present invention.

On the other hand, when desiring to lower the load voltage from the solar cell voltage, the circuit configuration as shown in FIG. 16 which uses a buck type DC-DC converter as a power converter circuit 24A is suitable.

In the buck type DC-DC converter illustrated in FIG. 16, a capacitor CF is connected in parallel with respect to the first terminal TO1 and second terminal TO2 of the PV 11.

The point of difference of the operation of a photovoltaic power generation system 100B in the case of using a buck type DC-DC converter as the power converting means from the case of using a boost type DC-DC converter is that the on/off state of the PWM signal generated in the control device 25 becomes reverse.

DC-DC Converter (3)

Figure 17:
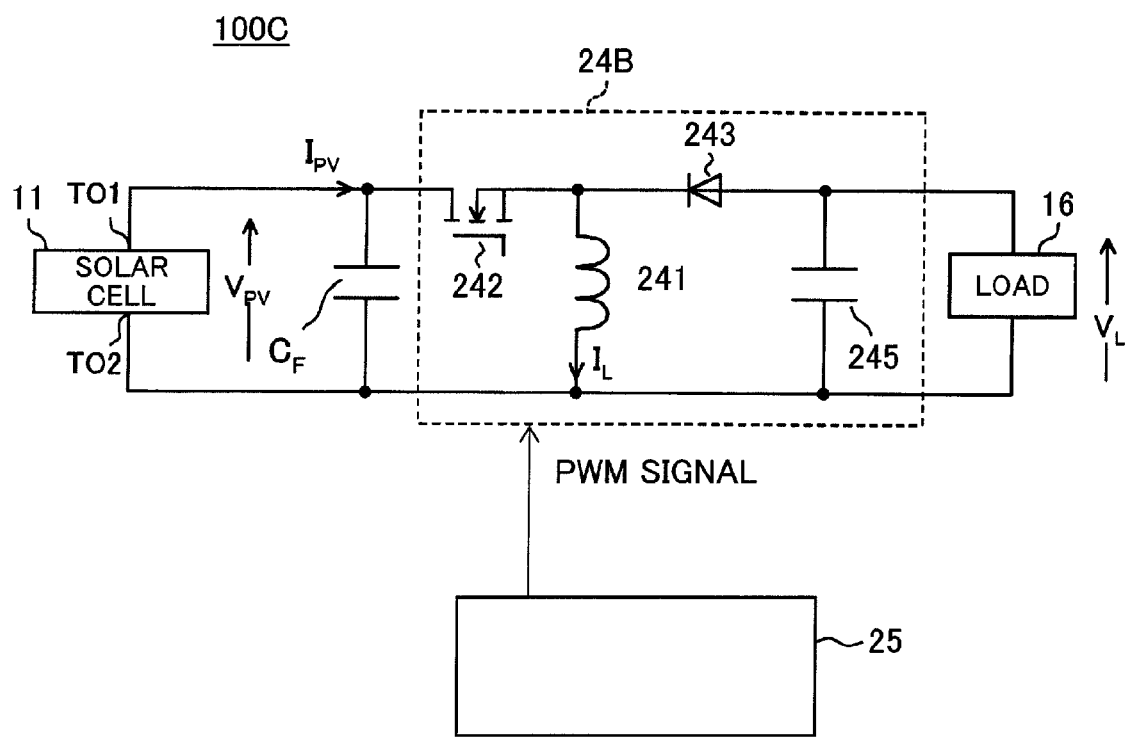
FIG. 17 A circuit diagram showing the configuration of a buck-boost type DC-DC converter which is applied to an embodiment of the present invention.

When desiring to lower or raise the voltage of the load 16 from the output voltage of the solar cell panel (PV) 11, as the DC-DC converter, the circuit configuration of the power converter circuit 24B using the boost-buck type DC-DC converter shown in FIG. 17 is suitable.

In the boost-buck type DC-DC converter illustrated in FIG. 17, the capacitor CF is connected in parallel with respect to the first terminal TO1 and second terminal TO2 of the solar cell panel (PV) 11. Further, the drain of the MOSFET 141 is connected to the first terminal TO1 of the PV 11, and the source is connected to the cathode of a diode D141 and one end of an inductor L141. The other end of the inductor L141 is connected to the second terminal TO2 of the PV 11, the capacitor C141, and the first electrode of CF, and the anode of the diode D141 is connected to the second electrode of the capacitor C141.

Switching (SW) Element

The MOSFET 242 was exemplified as an SW element in the DC-DC converter. However, the invention is not limited to a MOSFET 242. Various types of power SW elements can be used so far as the SW element has resistance against the voltage applied between the terminals of the solar cell panel (PV) 11, has a sufficient current capacity for the current flowing between the terminals of the PV 11, and can track a PWM control operation.

Fifth Embodiment

Figure 18:
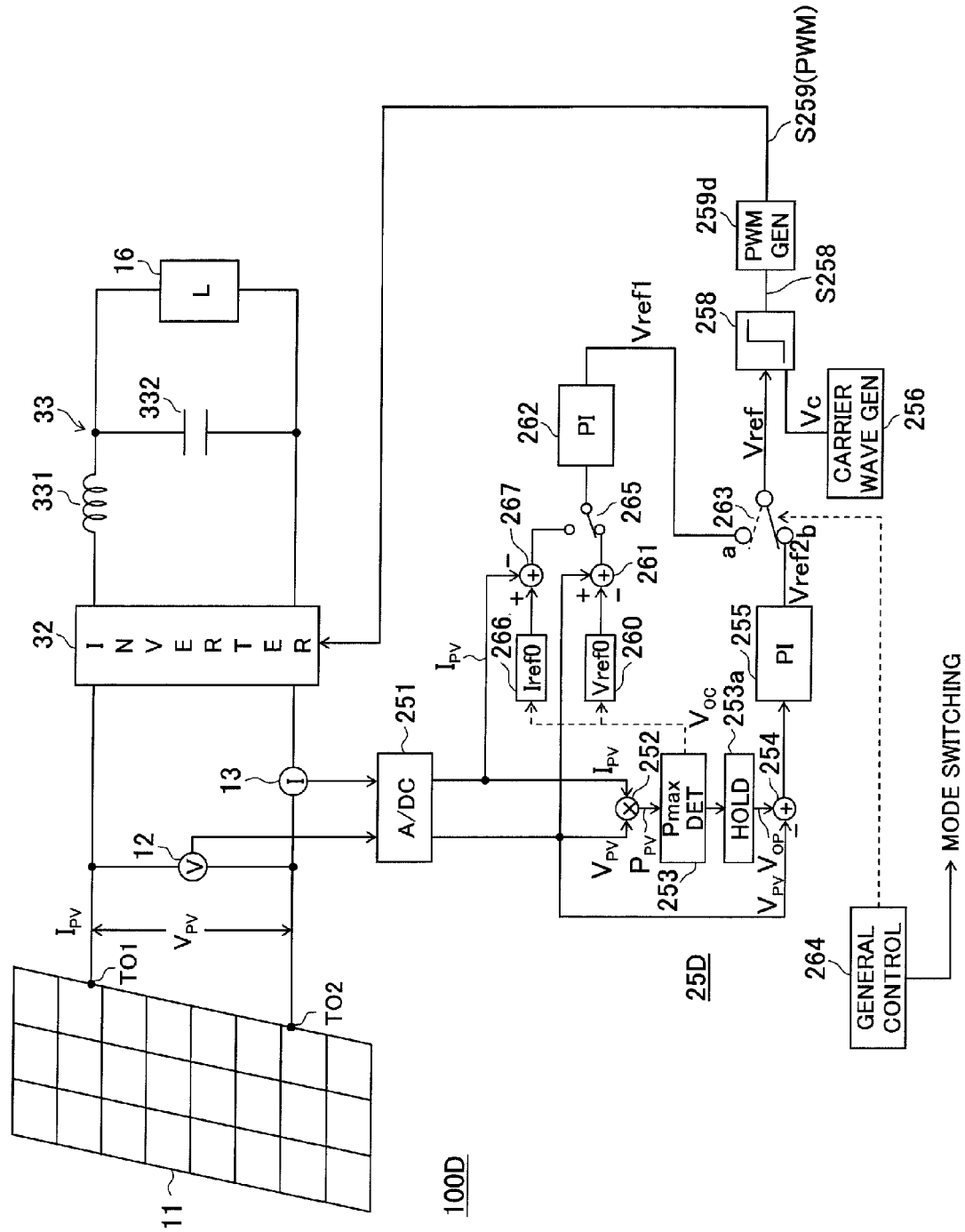
FIG. 18 A view of the configuration of a solar power generation system of a fifth embodiment of the present invention.
Figure 19:
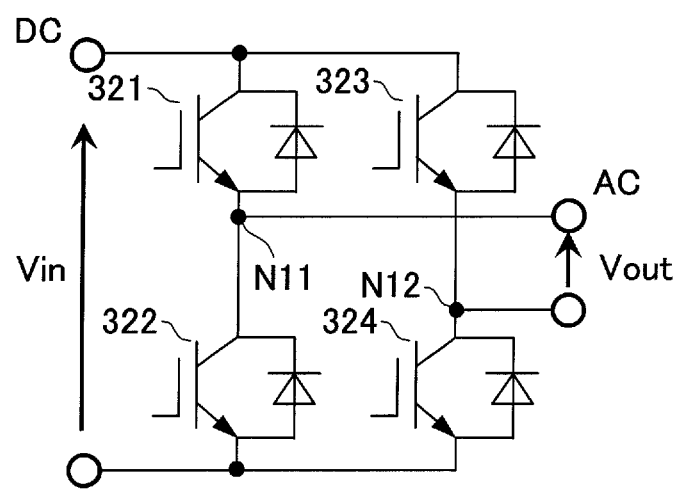
FIG. 19 A diagram showing an example of the circuit configuration of an inverter illustrated in FIG. 18.

Referring to FIG. 18 and FIG. 19, a fifth embodiment of the photovoltaic power generation system of the present invention will be explained.

A photovoltaic power generation system 100D illustrated in FIG. 18 uses an inverter 32 in place of the DC-DC converter 24 illustrated in FIG. 1 and FIG. 15 as the power converting means. The inverter 32 converts an input DC power to an AC power and supplies the result to the load 16.

Preferably, the photovoltaic power generation system 100D is provided with a filter circuit 33.

FIG. 19 shows the circuit configuration of a single phase inverter as an example of the inverter 32.

The illustrated single phase inverter has a first circuit formed by two serially connected power transistors 321 and 322 and a second circuit formed by serially connected two power transistors 323 and 324.

Reactive power bypass use diodes are connected in parallel to these power transistors 321, 322, 323, and 324.

For example, when the power transistors 321 and 324 simultaneously become ON, a "positive" voltage is output to the AC output terminal. On the other hand, when the power transistors 323 and 322 simultaneously become ON, a "negative" voltage is output to the AC output terminal. In this way, basically a rectangular AC voltage is output from the inverter 32 illustrated in FIG. 19.

Therefore, preferably, in the latter stage of the inverter 32, a smoothing filter 33 configured by an inductor 331 and capacitor 332 is provided to smooth the rectangular AC voltage and supply the AC voltage to the load 16. The smoothing filter 33 may be assembled in the inverter 32 as well.

If simultaneously setting the power transistors 321, 322, 323, and 324 to the first logic state, for example, the "ON state", the open-circuit state is exhibited if simultaneously setting the power transistors 321, 322, 323, and 324 set to the second logic state, for example, the "OFF state".

The operation of the photovoltaic power generation system 100D illustrated in FIG. 18 will be explained.

A control device 25D basically operates in the same way as the control device 25 explained with reference to FIG. 1. Below, the operation will be simply explained.

In the maximum power detection mode, the power transistors 321, 322, 323, and 324 in the inverter 32 are set to the first logic state, for example, the "open" state, to set the output terminals TO1 and TO2 of the PV 11 to the open-circuit state and thereby detect the open-circuit voltage (FIG. 4, step 12). After that, the power transistors 321, 322, 323, and 324 in the inverter 32 are set to the second logic state, for example, the "closed" state, to short-circuit the output terminals TO1 and TO2 of the PV 11 to detect the power $P_{PV}$, and the holding circuit 253a is made hold the output voltage $V_{PV}$ of the PV 11 at that time as the optimal output voltage Vop (FIG. 4, step 13).

In the tracking operation mode (FIG. 4, step 21), the power transistors 321, 322, 323, and 324 are PWM controlled so as to track the optimal voltage Vop which is output from the holding circuit 253a.

Note that, while the PWM signal generator 259 which is illustrated in FIG. 1 generates the signal for PWM control of one MOSFET 242, a PWM signal generator 259d in the control device 25D which is illustrated in FIG. 18 generates such four types of control signals that suitably set four power transistors 321, 322, 323, and 324 to the first logic state explained above, for example, the "open" state, or to the second logic state, for example, the "closed" state, and converts the DC power to the AC power under the PWM control.

Sixth Embodiment

Figure 20:
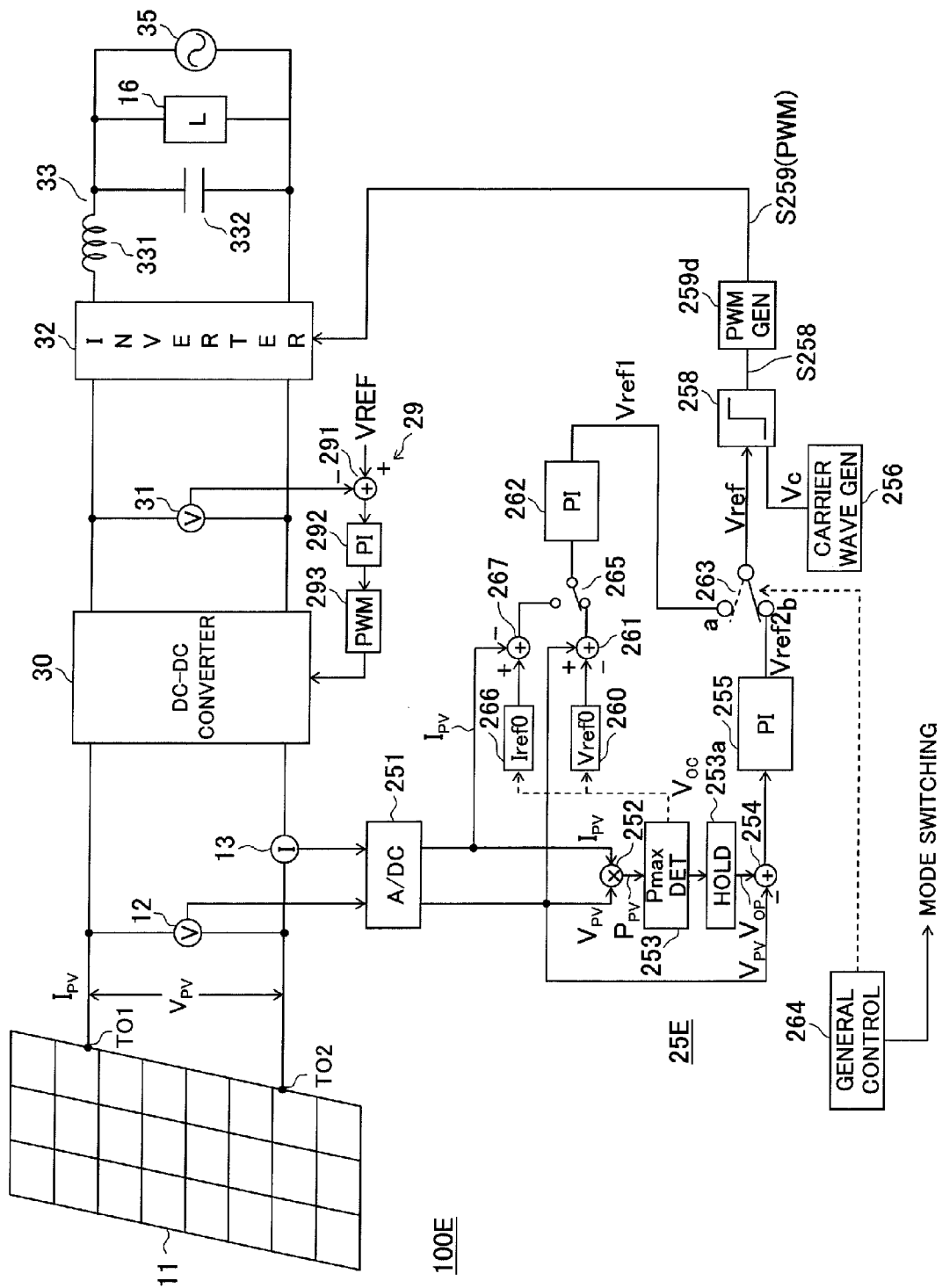
FIG. 20 A view of the configuration of a solar power generation system of a sixth embodiment of the present invention.

Referring to FIG. 20, a sixth embodiment of the photovoltaic power generation system of the present invention will be explained.

A photovoltaic power generation system 100E of the sixth embodiment is a grid interconnection type photovoltaic power generation system. A system power supply 35 is connected to the load 16.

A power converting means of the sixth embodiment is configured by a DC-DC converter 30 and inverter 32. A filter circuit 33 may be added to the latter stage of the inverter 32, or a filter circuit corresponding to the filter circuit 33 may be assembled in the inverter 32.

In the sixth embodiment, a voltmeter 31 which measures the output voltage of the DC-DC converter 30 is provided.

The control device of the sixth embodiment is configured by a first control unit 25E which controls the inverter 32 and by a second control unit 29 which controls the DC-DC converter 30.

In the sixth embodiment, the DC-DC converter 30 does not perform the operations in the maximum power detection mode and tracking operation mode as in the embodiments explained above, but the inverter 32 operates in the maximum power detection mode and tracking operation mode.

As the DC-DC converter 30, use can be made of the boost type DC-DC converter 24 illustrated in FIG. 1.

The inverter 32 can use for example a single phase inverter 32 illustrated in FIG. 19.

The second control unit 29 is configured by an adder circuit 291, proportional/integration (PI) processing circuit 292, and PWM signal generation circuit 293. These circuits can be configured by a computer as well.

The adder circuit 291 receives as input the reference voltage signal VREF for defining the voltage on the input side of the inverter 32, for example 180V, and calculates the voltage as the difference from the voltage which was obtained by measuring the output voltage of the DC-DC converter 30 by the voltmeter 31.

The PI processing circuit 292 performs proportional processing and integration processing on the differential voltage which was calculated in the adder circuit 291. The PI processing circuit 292 can be given the same circuit configuration as that of the control processor 255 illustrated in FIG. 1.

The PWM signal generation circuit 293 generates a signal for PWM control of the switching element in the DC-DC converter 30, for example, the switching element corresponding to the MOSFET 242 in the DC-DC converter 24 illustrated in FIG. 1, based on the PI processing results and supplies the same to the gate of the switching element.

The PWM signal generation circuit 293 can be given for example the same circuit configuration as that of the carrier wave generator 256 and PWM signal generator 259 illustrated in FIG. 1.

The second control unit 29 controls the DC-DC converter 30 so as to output the reference voltage signal VREF which defines the reference voltage of the input of the inverter 32. The DC-DC converter 30 operates so as to output the reference voltage signal VREF.

In this way, in the sixth embodiment, the DC-DC converter 30 does not perform operations as in the embodiments explained above in the maximum power detection mode and tracking operation mode, but the inverter 32 operates in the maximum power detection mode and tracking operation mode.

The first control unit 25E for example controls the operations of the power transistors 321, 322, 323, and 324 in the inverter 32 having the circuit configuration illustrated in FIG. 19 in accordance with the maximum power detection mode and tracking operation mode.

In the maximum power detection mode, the unit makes the power transistors 321, 322, 323, and 324 in the inverter 32 operate in the first logic state to detect the open-circuit voltage (FIG. 4, step 12), changes from the open-circuit state to the short-circuited state to detect the maximum power Pmax (FIG. 4, step 13), and makes the holding circuit 253a hold the voltage $V_{PV}$ at that time as the optimal voltage Vop.

Next, in the tracking operation mode (FIG. 4, step 21), the PWM signal generator 259d outputs PWM control signals to gates of the power transistors 321, 322, 323, and 324 in the inverter 32 in accordance with the optimal voltage Vop.

According to the sixth embodiment, the DC-DC converter 30 which outputs the reference voltage VREF is made to function as the reference voltage generating means and the inverter 32 carries out the operations in the maximum power detection mode and tracking operation mode in accordance with the load 16 and the situation of the system, therefore it is possible to realize control not depending upon the fluctuation of output of the solar cell panel (PV) 11.

Seventh Embodiment

A seventh embodiment will be explained.

In the embodiments explained above, the control device 25 performed the operations explained above. That is, in the maximum power detection mode, it measured the open-circuit voltage, generated the reference voltage signal $V_{ref}0$ which changes from the open-circuit voltage with a predetermined inclination in the VREF generator 260, and monitors the power $P_{PV}$ of the solar cell panel (PV) 11 in the short-circuited state to detect the maximum power Pmax. Then, it uses the output voltage $V_{PV}$ corresponding to that as the optimal output voltage Vop and controls the power converting means by PWM control so as to track the optimal output voltage Vop in the tracking operation mode.

In the seventh embodiment, in place of the above processing, in the maximum power detection mode, a short-circuit current $i_{sc}$ of the PV 11 is detected, and the IREF generator 266 generates a reference signal $I_{ref}0$ defined in the following equation.

$$I_{ref}0 = i_{sc} - (i_{sc}/t_D) \times t$$

where, $t_D$ is the time of t1 to t3 in FIG. 2.

Here, the time period t0 to t1 is the "closed" operation as the first logic state, and the time period t1 to t3 is the "open" operation as the second logic state.

Figure 21A:
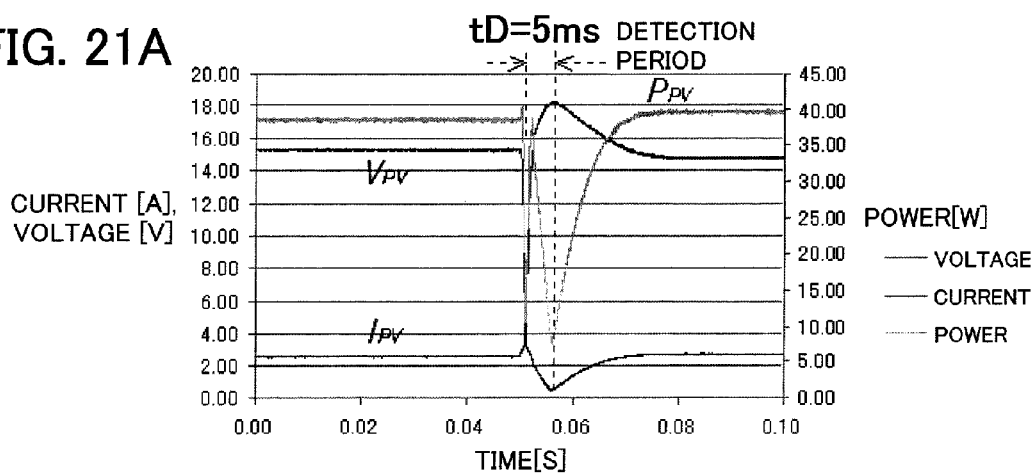
FIG. 21 A diagram showing measured values in a seventh embodiment of the present invention.
Figure 21B:
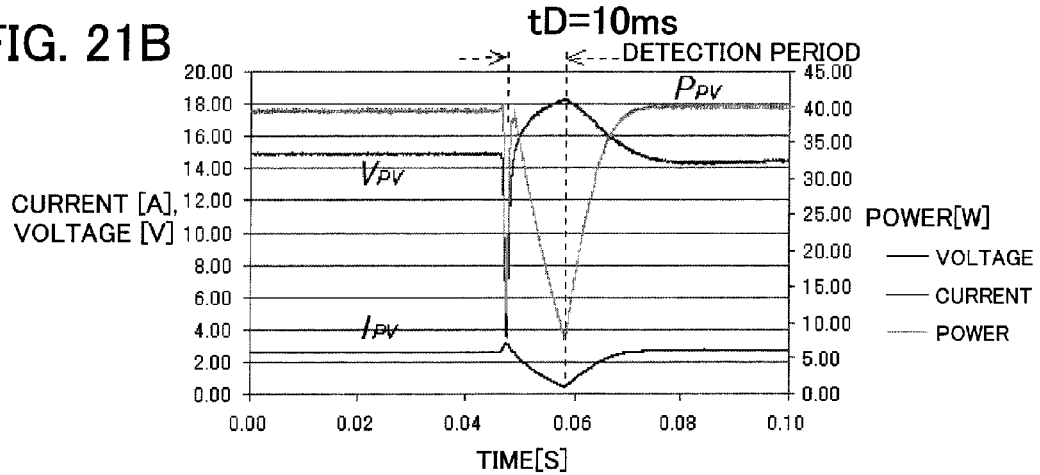

FIG. 21 are diagrams showing measurement results according to the seventh embodiment. FIG. 21A shows the change of the short-circuit current $i_{sc}$ etc. of the solar cell panel (PV) 11 when the detection period (time) $t_D$ is 5 ms, and FIG. 21B shows the change of the short-circuit current $i_{sc}$ etc. of the PV 11 when the detection period $t_D$ is 10 ms.

According to the seventh embodiment, a large number of measurement values of power $P_{PV}$ can be secured in the detection time $t_D$ for detecting the maximum power Pmax point without being influenced by the irradiance upon the PV 11, temperature, and another factors, therefore there is the

Eighth Embodiment

Figure 22:
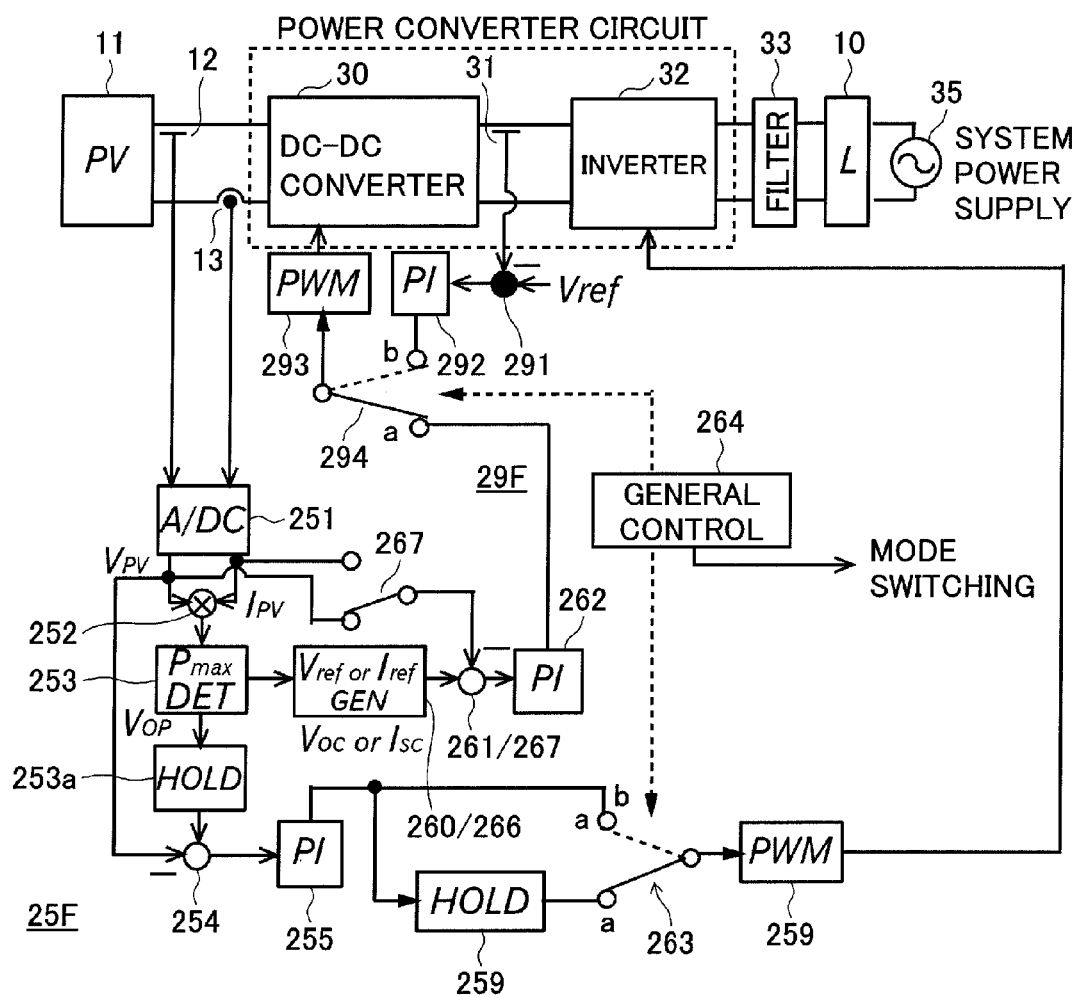
FIG. 22 A view of the configuration of the solar power generation system of an eighth embodiment of the present invention.

Referring to FIG. 22, an eighth embodiment will be explained.

A photovoltaic power generation system 100F illustrated in FIG. 22 is a grid interconnection type photovoltaic power generation system the same as that illustrated in FIG. 20. A system power supply 35 is connected to the load 16.

In the eighth embodiment, in the same way as the sixth embodiment, based on the judgment of the general controller 264, the DC-DC converter 30 controls the output voltage constant and the inverter 32 adjusts the load. Note, the method for that is different from that in the sixth embodiment.

FIG. 22 shows a simplified configuration. However, circuit elements having the same notations are the same as the circuit elements illustrated in FIG. 20. Below, the important points of difference will be explained.

(1) The control device in the eighth embodiment is also configured by a control unit 25F which control the inverter 32 and a second control unit 29F which controls the DC-DC converter 30. In FIG. 22, the reference voltage generator 261 and reference current generator 266, adders 261 and 266, and further SWs 265 and 267 which are illustrated in FIG. 20 are simply illustrated all together. In FIG. 22, a holding circuit 259 which holds the output of the PI processing circuit 255 is provided so as to enable the selection of the PI processing results of this cycle or the PI processing results of the previous cycle which are held in the holding circuit 259 by the switching part 263.

(2) The second control unit 29F has a switching (SW) circuit 294 other than the adder circuit 291, PI processing circuit 292, and PWM signal generation circuit 293. The SW circuit 294 outputs the output of the PI processing circuit 262 or output of the PI processing circuit 292 to the PWM signal generator 293 in response to a control instruction by the general controller 264.

In the eighth embodiment, in the maximum power detection mode, the general controller 264 selects the first contacts "a" of the SW 263 and SW 294. As a result, based on the output signal of the PI processor 262, the PWM signal generator 293 controls the DC-DC converter 30, the output of the holding circuit 259 which holds the previous value of the PI processor 255 is selected, and the PWM signal generator 259 controls the inverter 32 in accordance with the selected signal to thereby detect the maximum power.

In the tracking control mode, the general controller 264 selects the second contacts "b" of the SW 263 and SW 294. As a result, based on the output signal of the PI processor 292 which perform proportional/integration processing on the difference between the value by the voltmeter 31 and the reference voltage Vref, the PWM signal generator 293 controls the DC-DC converter 30 so that the DC-DC converter 30 outputs the reference voltage Vref.

When comparing the eighth embodiment using the DC-DC converter 30 and inverter 32 and the fourth embodiment provided with the DC-DC converter 24 and battery 28 explained with reference to FIG. 15, there is the advantage that no fluctuation of load is caused.

Further, when comparing the invention disclosed in PLT 2 and the embodiments of the present invention explained above, in the embodiments of the present invention, the detection time of the maximum power can be made any time without regard as to the capacity of the inductor. For this reason, there is the advantage that the detection of the maximum power becomes more accurate if the detection time is made longer.

Contrary to this, the invention disclosed in PLT2 is predicated on short-circuiting of the inductor, so there is the restriction that the smaller the capacitor of the inductor, the shorter the maximum power detection time.

The present invention was explained above by illustrating a plurality of embodiments, but the present invention is not limited to the concrete embodiments explained above when being worked. Various modifications can be employed.

REFERENCE SIGNS LIST 100, 100A to 100E . . . photovoltaic power generation systems,
11 . . . solar cell panel, 16 . . . load, 24 . . . power converter circuit (DC-DC converter), 25 . . . control device, 28 . . . battery, 20 . . . second control unit, 30 . . . DC-DC converter, 32 . . . inverter, 251 . . . ADC, 252 . . . multiplier, 253 . . . maximum power detector, 253a . . . optimal voltage holding circuit, 254 . . . first adder, 255 . . . first control processor, 256 . . . carrier wave generator, 258 . . . comparator, 260 . . . reference voltage generator, 26 . . . second adder, 262 . . . second control processor, 263, 265 . . . switch (SW), and 264 . . . general controller.

[FIG. 1]
24. DC-DC CONVERTER
264. GENERAL CONTROL
MODE SWITCHING
256. CARRIER WAVE
[FIG. 2]
PWM SIGNAL
TRACKING OPERATION PERIOD
Pmax DETECTION PERIOD (IV SCAN)
TRACKING OPERATION PERIOD
[FIG. 3]
Basic Operation of Controlling Light Power Generation Unit of Present Invention
OPERATION IN MAXIMUM POWER GENERATION MODE OF STEP 1 AND OPERATION IN TRACKING OPERATION MODE OF STEP 2 ARE ALTERNATELY AND CONTINUOUSLY REPEATED BY PREDETERMINED PERIOD STEP 1
Operation of Maximum Power Generation Mode
DETECT MAXIMUM POWER OF PHOTOVOLTAIC POWER GENERATION UNIT AT THAT TIME AND FIND OPTIMAL OPERATION VOLTAGE CORRESPONDING TO DETECTED MAXIMUM POWER STEP 2
Operation of Tracking Operation Mode
OPERATE POWER CONVERTING MEANS USING OPTIMAL OPERATION VOLTAGE FOUND IN MAXIMUM POWER GENERATION MODE AS REFERENCE VOLTAGE.
[FIG. 4]
S11. MAXIMUM POWER GENERATION MODE
TIME t0: START PROCESSING OF MAXIMUM POWER GENERATION MODE, DRIVE OF REFERENCE VOLTAGE GENERATOR AND REFERENCE CURRENT GENERATOR
S12. MAXIMUM POWER GENERATION MODE
PERIOD t0~t1: DETECTION OF OPEN-CIRCUIT VOLTAGE,
OPEN OUTPUT TERMINALS OF SOLAR CELL PANEL AND DETECT THAT OPEN-CIRCUIT VOLTAGE S13. MAXIMUM POWER GENERATION MODE
PERIOD t1~t3: DETECT MAXIMUM POWER
PERFORM PWM CONTROL IN ACCORDANCE WITH DIFFERENTIAL VOLTAGE BETWEEN REFERENCE VOLTAGE AND OUTPUT VOLTAGE AND DETECT MAXIMUM POWER
S14. TIME t3, END OF MAXIMUM POWER GENERATION MODE (SWITCHING OF OPERATION MODE)
FROM MAXIMUM POWER GENERATION MODE TO TRACKING MODE
S21. AFTER POINT t3, OPERATION OF TRACKING MODE
PWM CONTROL SO AS TO OBTAIN DETECTED MAXIMUM POWER
S22. JUDGMENT OF END OF TRACKING MODE DOES PREDETERMINED TIME PASSED?
CHANGE OF OUTPUT OF SOLAR CELL PANEL IS LARGE
[FIG. 5]
DETECTION PERIOD
[FIG. 6]
I-V AT TIME WHEN NO SHADOW IS ADDED
TIME WHEN SHADOW IS ADDED
OPERATION POINT A
P-V AT TIME WHEN NO SHADOW IS ADDED
OPERATION POINT B
P-V AT TIME WHEN SHADOW IS ADDED
VOLTAGE
PANEL TEMPERATURE 33[° C.], IRRADIANCE
[FIG. 7]
PANEL TEMPERATURE
IRRADIANCE
PARTIAL SHADOW
IRRADIANCE
TIME
HILL-CLIMBING METHOD
Example of Unstable Tracking Operation Near Operation Point B
PANEL TEMPERATURE
IRRADIANCE
PARTIAL SHADOW
IRRADIANCE
TIME
INSTANTANEOUS SCANNING METHOD
EXAMPLE OF STABLE TRACKING OPERATION AT OPERATION POINT A
[FIG. 8]
IRRADIANCE
TIME
SOLAR CELL OUTPUT POWER
[FIG. 9]
IRRADIANCE
TIME
SOLAR CELL OUTPUT
[FIG. 11]
NO SHADOW
RELIABLY MOVE TO P
SHADOW
[FIG. 12]
NO SHADOW
TO MPPT
SHADOW
[FIG. 13]
IRRADIANCE OF PANEL SURFACE
TIME
SOLAR CELL USEFUL UTILIZATION FACTOR UUF
[FIG. 14]
IRRADIANCE
SOLAR CELL OUTPUT $P_{PV}$[W], SOLAR CELL USEFUL UTILIZATION FACTOR UUF
[FIG. 15]
24. DC-DC CONVERTER
264. GENERAL CONTROL
MODE SWITCHING
256. CARRIER WAVE GEN
[FIG. 16]
11. SOLAR CELL
PWM SIGNAL
[FIG. 17]
11. SOLAR CELL
PWM SIGNAL
16. LOAD
[FIG. 18]
32. INVERTER
264. GENERAL CONTROL
MODE SWITCHING
256. CARRIER WAVE GEN
[FIG. 20]
30. DC-DC CONVERTER
32. INVERTER
264. GENERAL CONTROL
MODE SWITCHING
256. CARRIER WAVE GEN
[FIG. 21] EXAMPLE OF OPERATION WAVEFORM
CURRENT [A], VOLTAGE [V]
DETECTION PERIOD
POWER
TIME
VOLTAGE
CURRENT
POWER
CURRENT [A], VOLTAGE [V]
DETECTION PERIOD
POWER
TIME
VOLTAGE
CURRENT
POWER
[FIG. 22]
POWER CONVERTER CIRCUIT
30. DC-DC CONVERTER
32. INVERTER
35. SYSTEM POWER SUPPLY
264. GENERAL CONTROL
MODE SWITCHING

The invention claimed is:

1. A light power generation system comprising:
 a light power generation unit for generating power in response to incident light;
 a voltage detecting means for detecting an output voltage of the light power generation unit;
 a current detecting means for detecting an output current of the light power generation unit, or a power detecting means for detecting an output power of the light power generation unit;
 a power converting means including a switching element for making an open state and close state between the output terminals of the light power generation unit, converting the voltage between the output terminals of the light power generation unit, and outputting a power corresponding to said voltage; and
 a controlling means for performing a control operation of a maximum power detection mode for detecting the maximum power of the light power generation unit at that time and a control operation of a tracking operation mode for carrying out a tracking control so that the maximum power detected in the maximum power detecting mode can be output from the light power generation unit, wherein the controlling means, in the maximum power detection mode, makes the switching element in the power converting means operate ON state and OFF state to result in a first voltage state between the output terminals of the light power generation unit, makes the switching element operate ON state and OFF state to change the state of the voltage between the output terminals of the light power generation, from the first voltage state to a second voltage state different to the first voltage state, and during a transition state moving from the first voltage state to the second voltage state, detects a time at which the power of the product of the voltage which was detected by the voltage detecting means and the current which was detected by the current detecting means or the power which was detected by the power detecting means becomes the maximum, and defines a voltage which was detected by the voltage detecting means at the time when detecting the maximum power as the optimal output voltage, and wherein, the controlling means, in the tracking operation mode, makes the switching element operate ON state and OFF state so that a difference between a reference voltage which is the optimal output voltage and the voltage which was detected by the voltage detecting means becomes "0" or almost "0".

2. The light power generation system as set forth in claim 1, wherein the power converting means includes a DC-DC converter which includes the switching element which is provided so as to open/close the output terminals of the light power generation unit.

3. The light power generation system as set forth in claim 1, wherein the power converting means includes an inverter which includes the switching element which was provided so as to open/close the output terminals of the light power generation unit.

4. The light power generation system as set forth in claim 1, wherein:
the power converting means includes
a DC-DC converter provided between the output terminals of the light power generation unit constant, and
an inverter which includes the switching element which is provided in an output side of the DC-DC converter, and
the controlling means has
a first controlling means for controlling the DC-DC converter, so that the voltage between the output terminals of the light power generation unit is maintained constant, and
a second controlling means for controlling the inverter in response to a state of a load.

5. The light power generation system as set forth in claim 1, which the controlling means corrects an operation point of a hill-climbing method by using the optimal output voltage detected in the maximum power detection mode.

6. The light power generation system as set forth in claim 1, wherein the light power generation unit comprises a solar cell generation unit for generating power in response to an incident light.

7. The light power generation system as set forth in claim 1, wherein
the first voltage state is an open state of the output terminals of the light power generation unit, and the second voltage state is a short state of the output terminal, or
the first voltage state is a short state of the output terminal, and the second voltage state is an open state of the output terminal, or
the first voltage state is a first state of a first voltage of the output terminal, and the second voltage state is a second state of a second voltage different to the first voltage of the output terminal.

8. A control device which is applied to a light power generation control system which comprises a light power generation unit which generates power in response to incident light, a voltage detecting means for detecting an output voltage of the light power generation unit, a current detecting means for detecting an output current of the light power generation unit or a power detecting means for detecting an output power of the light power generation unit, and a power converting means which includes a switching element for making an open state and close state between the output terminals of the light power generation unit, converts the voltage between the output terminals of the light power generation unit, and outputs a power corresponding to said voltage, wherein
the control device is a control device which performs a control operation in a maximum power detection mode for detecting the maximum power of the light power generation unit at that time and a control operation in a tracking operation mode for carrying out a tracking control so that the maximum power detected in the maximum power detecting mode can be output from the light power generation unit, and
the control device,
in the maximum power detection mode,
makes the switching element in the power converting means operate ON and OFF state to result in to the first voltage state between the output terminals of the light power generation unit and
makes the switching element operate ON state and OFF state to change the state of the voltage between the output terminals of the light power generation, from the first voltage state to a second voltage state different to the first voltage state, and during a transition state moving from the first voltage state to the second voltage state, detects a time at which the power of the product of the voltage which was detected by the voltage detecting means and the current which was detected by the current detecting means or the power which was detected by the power detecting means becomes the maximum, and defines a voltage which was detected by the voltage detecting means at the time when detecting the maximum power as the optimal output voltage, and
in the tracking operation mode,
defines the optimal output voltage as a reference voltage and makes the switching element operate ON and OFF state so that the difference between the reference voltage and the voltage detected by the voltage detecting means becomes "0" or almost "0".

9. The control device as set forth in claim 8, wherein:
the control device comprises
a maximum power detecting means for operating in the maximum power detection mode, monitoring the power of the product of the voltage which was detected by the voltage detecting means and the current which was detected by the current detecting means or the power which was detected by the power detecting means, detecting the maximum power, and detecting the optimal voltage corresponding to the detected maximum power, a holding means for holding the detected optimal voltage, a reference signal generating means, when operating in the maximum power detection mode, generating a first reference signal for making the switching element in the power converting means operate ON state and OFF state during a transition time from the first voltage state to the second voltage state between the output terminals of the light power generation unit, and a second reference signal for making the switching element ON state and OFF state so that the output terminal of the light power generation unit which falls by a predetermined rate to the second voltage state from the first voltage state during the transition time, a first controlled operating means for generating a control signal in accordance with a difference between the first and second reference signals which are output from the reference signal generating means and the voltage which was detected by the voltage detecting means in the maximum power detection mode, a second controlled operating means for generating a control signal in accordance with a difference between the optimal voltage which is held in the holding means and the voltage which was detected by the voltage detecting means in the tracking operation mode, a signal selecting means for selecting and outputting the output signal of the first controlled operating means in the maximum power detection mode and selecting and outputting the output signal of the second controlled operating means in the tracking operation mode, a control signal generating means for generating a control signal for controlling the drive of the switching element of the power converting means in accordance with the output signal of the signal selecting means, and a mode controlling means for switching between the maximum power detection mode and the tracking operation mode.

10. The control device as set forth in claim 9, wherein:
the power converting means includes a DC-DC converter which includes the switching element which is provided so as to open/close the output terminals of the light power generation unit, and
the control device controls drive of the switching element in the DC-DC converter so that the voltage between the output terminal of the light generation unit is maintained constant.

11. The control device as set forth in claim 10, wherein:
the power converting means includes a DC-DC converter which is controlled so as to maintain the voltage between the output terminals of the light power generation unit constant, and
an inverter which includes the switching element which is provided in the output side of the DC-DC converter and is controlled in accordance with a load, and
the controlling means performs
first control processing of controlling the DC-DC converter, and
second control processing of controlling the inverter.

12. The control device as set forth in claim 8, wherein the control signal generating means generates a control signal for controlling by PWM the switching element of the power converting means in accordance with the output signal of the signal selecting means.

13. The control device as set forth in claim 8, which corrects an operation point of a hill-climbing method by using the optimal output voltage detected in the maximum power detection mode.

14. The control device as set forth in claim 8, wherein the light power generation unit comprises a solar cell generation unit for generating power in response to an incident light.

15. The control device as set forth in claim 8, wherein
the first voltage state is an open state of the output terminals of the light power generation unit, and the second voltage state is a short state of the output terminal, or
the first voltage state is a short state of the output terminal, and the second voltage state is an open state of the output terminal, or
the first voltage state is a first state of a first voltage of the output terminal, and the second voltage state is a second state of a second voltage different to the first voltage of the output terminal.

16. A control method which is applied to a light power generation system which has a light power generation unit which generates power in response to incident light, a voltage detecting means for detecting a terminal voltage of the light power generation unit, a current detecting means for detecting an output current of the light power generation unit or a power detecting means for detecting an output power of the light power generation unit, and a power converting means including a switching element for making an open state and close state between the output terminals of the light power generation unit and converting the voltage between the output terminals of the light power generation unit and outputting a power of the corresponding to said voltage, wherein
the control method performs a control operation in a maximum power detection mode for detecting the maximum power of the light power generation unit at that time and a control operation in a tracking operation mode for carrying out a tracking control so that the maximum power detected in the maximum power detecting mode can be output from the light power generation unit, controlling the switching element in the two modes, and comprises steps of,
in the maximum power detection mode,
making the switching element in the power converting means operate ON state and OFF state to result in a first voltage state between the output terminals of the light power generation unit,
making the switching element operate ON state and OFF state to change the state of the voltage between the output terminals of the voltage between the output terminals of the light power generation, from the first voltage state to a second voltage state different to the first voltage state, and during a transition state moving from the first voltage state to the second voltage state, detecting a time at which the power of the product of the voltage which was detected by the voltage detecting means and the current which was detected by the current detecting means or the power which was detected by the power detecting means becomes the maximum, and defining a voltage which was detected by the voltage detecting means at the time when detecting the maximum power as the optimal output voltage, and
in the tracking operation mode,
using the optimal output voltage as a reference voltage and making the switching element operate ON state and OFF state so that a difference between the reference voltage which is the optimal output voltage and the voltage which was detected by the voltage detecting means becomes "0" or almost "0".

17. The control method as set forth in claim 16, which corrects an operation point of a hill-climbing method by using the optimal output voltage which was detected in the maximum power detection mode.

18. The control method as set forth in claim 16, wherein the light power generation unit comprises a solar cell generation unit for generating power in response to an incident light.

19. The control method as set forth in claim 16, wherein
the first voltage state is an open state of the output terminals of the light power generation unit, and the second voltage state is a short state of the output terminal, or
the first voltage state is a short state of the output terminal, and the second voltage state is an open state of the output terminal, or
the first voltage state is a first state of a first voltage of the output terminal, and the second voltage state is a second state of a second voltage different to the first voltage of the output terminal.

* * * * *